May 19, 1959 H. H. STROZIER 2,887,647

VOLTAGE DIVIDER FOR SWITCHING CAPACITORS

Filed Jan. 5, 1954

8 Sheets-Sheet 1

INVENTOR.
Henry H. Strozier
BY Lee H. Kaiser
Attorney

May 19, 1959 H. H. STROZIER 2,887,647

VOLTAGE DIVIDER FOR SWITCHING CAPACITORS

Filed Jan. 5, 1954 8 Sheets-Sheet 2

INVENTOR.
Henry H. Strozier
BY Lee H. Kaiser
Attorney.

May 19, 1959 H. H. STROZIER 2,887,647

VOLTAGE DIVIDER FOR SWITCHING CAPACITORS

Filed Jan. 5, 1954

8 Sheets-Sheet 3

INVENTOR.
Henry H. Strozier
BY
Lee H. Kaiser
Attorney

INVENTOR.
Henry H. Strozier
BY Lee H. Kaiser
Attorney

May 19, 1959 H. H. STROZIER 2,887,647

VOLTAGE DIVIDER FOR SWITCHING CAPACITORS

Filed Jan. 5, 1954 8 Sheets-Sheet 5

INVENTOR.
Henry H. Strozier
BY Lee H. Kaiser
Attorney

May 19, 1959 H. H. STROZIER 2,887,647

VOLTAGE DIVIDER FOR SWITCHING CAPACITORS

Filed Jan. 5, 1954 8 Sheets-Sheet 6

INVENTOR.
Henry H. Strozier
BY Lee H. Kaiser
Attorney

May 19, 1959 H. H. STROZIER 2,887,647

VOLTAGE DIVIDER FOR SWITCHING CAPACITORS

Filed Jan. 5, 1954

8 Sheets-Sheet 7

INVENTOR.
Henry H. Strozier
BY Lee H. Kaiser
Attorney

VOLTAGE DIVIDER FOR SWITCHING CAPACITORS

Filed Jan. 5, 1954

8 Sheets-Sheet 8

INVENTOR.
Henry H. Strozier
BY Lee H. Kaiser
Attorney 2,887,647

VOLTAGE DIVIDER FOR SWITCHING CAPACITORS

Henry H. Strozier, Atlanta, Ga., assignor to McGraw-Edison Company, a corporation of Delaware Application January 5, 1954, Serial No. 402,296
23 Claims. (Cl. 323—93)

This invention relates to alternating current transmission and distribution lines and more particularly to shunt capacitor banks for supplying reactive power to such lines.

Capacitors are frequently connected in shunt to alternating current transmission and distribution lines to relieve the system of the need of carrying at least part of the reactive requirements of the load, i.e., to relieve the line and source equipment of wattless current. Because of variation in load demand, it has not been found advisable to use unswitched shunt capacitors for the compensation of all the load kilovar requirements. It is more economical to apply part of the power factor correction in the form of controlled shunt capacitors. Generally, the kilovars of capacitance required to achieve a power factor near unity at peak system loads are greater than are needed at the minimum system load, and if permanently connected would create a leading power factor at light load. In order to prevent this condition, it is necessary to provide means for disconnecting the capacitors from the system at light loads. When a relatively large amount of capacitance is required, the usual arrangement is to utilize the necessary number of capacitors of standard kva. and voltage rating connected together in a suitable series-parallel arrangement.

In large high voltage capacitors banks, the capacitors are usually connected in groups, each group consisting of a number of capacitors connected in parallel, and a number of such groups connected in series from phase to phase or from phase to neutral of the transmission or distribution system. The phase to phase, or phase to neutral, voltage determines the number of series groups. For many years transformers were used to step down the voltage to the range of the capacitor ratings. This was superseded a few years ago by the practice of connecting low voltage capacitors in series-parallel groups and directly to the high voltage line which was found more economical than the use of high voltage capacitors or transformers and low voltage capacitors.

Although a capacitor bank can be switched in one step, it is general practice to provide switching so that a large bank is connected to the system as needed in several equal steps. Changes in operating conditions of the circuit usually require variations in the amount of connected capacitive reactance, and it is therefore common practice to divide the total capacitive reactance of a bank into a plurality of steps, usually of equal size, each of which is provided with its own circuit breaker. The circuit breaker switches at full phase to phase, or phase to neutral, voltage and, in addition, must be capable of handling short circuit currents. Restriking phenomena and the attendant voltage surges are encouraged when switching capacitive currents involved in deenergizing capacitor banks. When a large capacitor bank is de-energized, larger than normal system voltages may exist across the circuit breaker contacts because of the trapped charge on the capacitors and thus impose a greater than normal task on the circuit breaker dielectric.

If restriking occurs, there may be voltage stresses above normal on the capacitors. Consequently, elimination of restrikes is one of the principal objectives in capacitor switching.

It is an object of the invention to provide a new and improved circuit arrangement for the switching of shunt capacitors.

It is a further object of the invention to obviate the necessity of an expensive circuit breaker for each step in the switching of a shunt capacitor bank.

Another object of the invention is to provide means in a shunt capacitor bank for connecting the capacitors, or the capacitors comprising a step, to the power system at voltages which are only a fraction of the phase-to-phase, or phase-to-neutral, voltage of the system. A further object of the invention is to provide such switching means which is free from restrikes.

A still further object of the invention is to provide means for preventing sharp rises in voltage when a capacitor bank step of large capacitive reactance is connected to a power system.

Still another object of the invention is to provide means for connecting the capacitive reactance of a shunt capacitor to a power system in small incremental steps whereby a smooth control of power factor is obtained.

Briefly, these and other objects of the invention are accomplished by switching the first step of serially connected groups of paralleled capacitors of a bank at full line voltage and utilizing these switched, serially connected groups as a voltage divider for switching subsequent steps at voltages which are only a fraction of the full line voltage. Each group of parallel capacitors to be switched in subsequent steps is arranged in a series circuit with a switch of low voltage rating and one of the serially connected groups of capacitors switched in the first step. Operation of the low voltage switch connects the group of parallel capacitors in shunt with one of the similar groups of capacitors which is already connected to the line. Thus, if the first step consists of 7 serially connected groups of capacitors, the capacitors of the remaining steps are switched at voltages which are only 1/7 times the line voltage. Means are provided for operating all 7 switches of a subsequent step substantially simultaneously.

Other objects and advantages of the invention will be apparent from the following description of the preferred embodiment of the invention taken in connection with the accompanying drawing wherein.

Figures 14, 15:
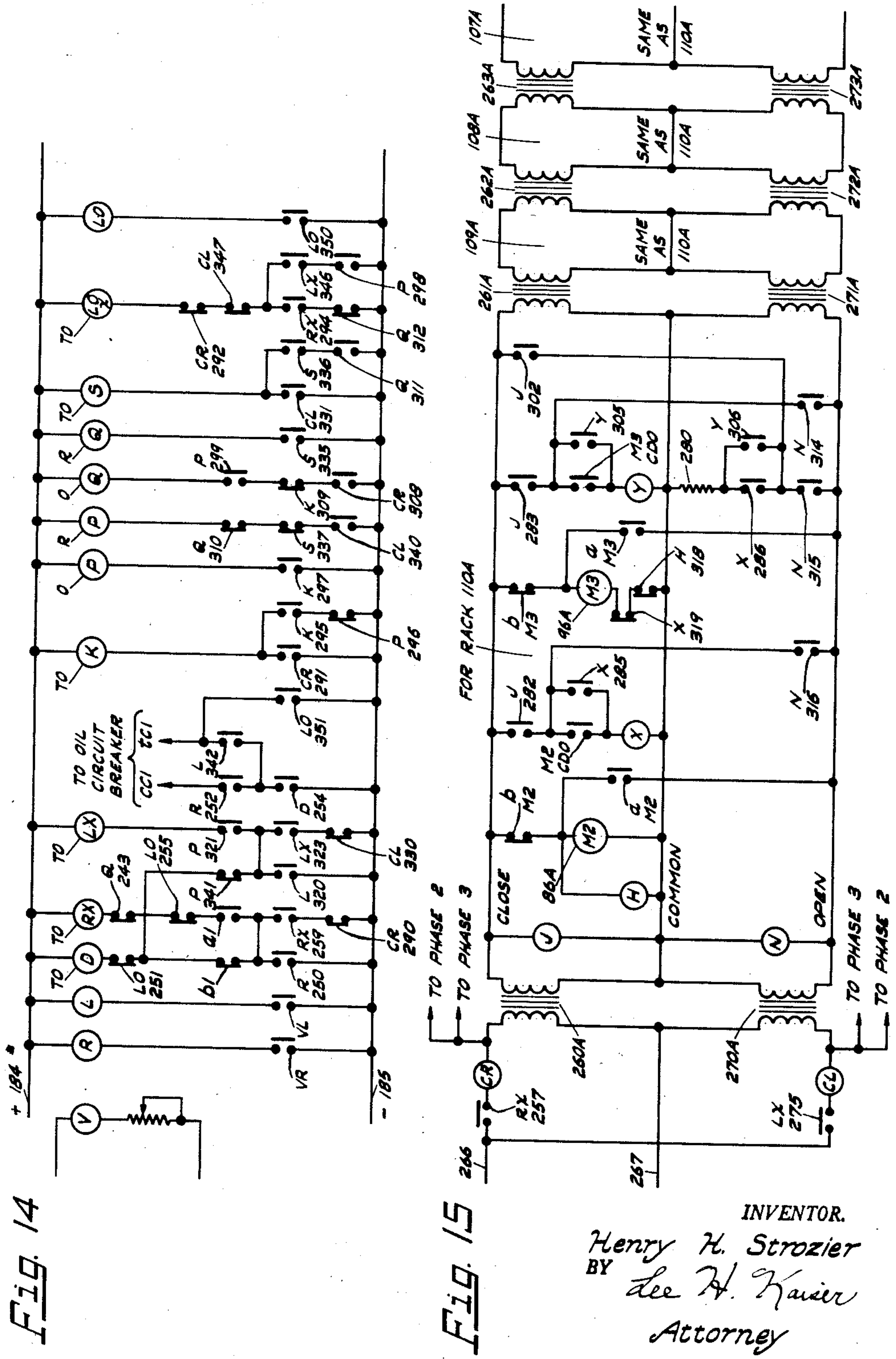

Fig. 14 is a circuit diagram schematically illustrating a control circuit which cooperates with the twelve operating circuits, one for each rack, shown in Fig. 15 to accomplish gang operation of the low voltage switches as a function of system voltage through electrical actuation of the low voltage switches; and Fig. 15 is a circuit diagram of an operating circuit for each rack which cooperates with the control circuit of Fig. 14 to electrically actuate only those low voltage switches of the rack which correspond to the step being switched.

Figure 1:
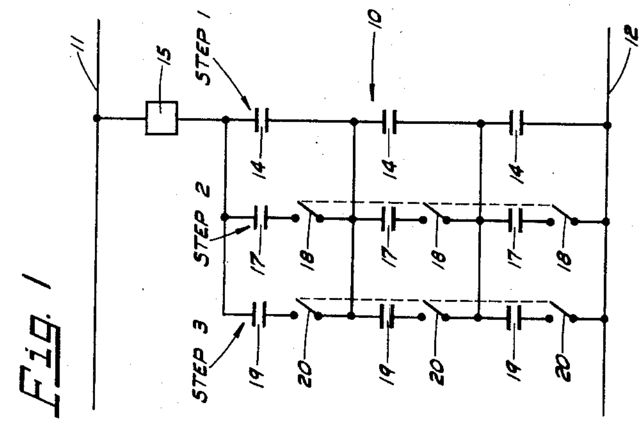
Fig. 1 is a circuit diagram schematically illustrating the voltage divider principle of the invention for switching capacitors in shunt to a power line.

Referring to the drawing and in particular to Fig. 1 which schematically illustrates the voltage divider principle of the invention, a capacitor bank 10 is adapted to be connected across conductors 11 and 12 which may be the line conductors of a single phase transmission or distribution line, or which may be a phase conductor and neutral of a three phase line. To provide smooth power factor control, it is desirable to divide the bank 10 into groups of equal capacitive reactance. This permits switching of the bank 10 to the system in equal steps, three such groups being illustrated in Fig. 1, and the term "step" is hereinafter intended to refer to the group of capacitors of a bank which are connected at one time to the power line. It is uneconomical to provide high voltage capacitors which will withstand the full voltage between conductors 11 and 12, and the individual low voltage capacitors 14 of the first step are connected in series and adapted to be connected across conductors 11 and 12 by a circuit breaker 15.

As discussed hereinbefore, the circuit breaker for switching capacitors at full line voltage must be capable of handling short circuit currents and is subject to restrikes and cumulative voltage build-up. In order to interrupt the current to the capacitors with a minimum of restriking the circuit breaker 15 is preferably of the oil-filled type. Prior art installations in which an expensive oil circuit breaker insulated for full line voltage was provided for each step of the bank were unnecessarily expensive. In accordance with the present invention the subsequent steps of the capacitor bank are switched at voltages which are only a fraction of the line voltage.

Each individual capacitor 17 of the second step is connected in a series circuit with a capacitor 14 of the first step and a relatively low voltage switch 18. The voltage across each capacitor 14 is only $1/n$ times the line voltage, where $n$ is the number of serially connected groups of the first step. Each switch 18 thus switches at a voltage only $1/n$ times the line voltage. Consequently, each switch 18 interrupts currents at considerably lower voltages than the oil circuit breaker 15 and can be of correspondingly low voltage insulation rating. The switches 18 of the second step are ganged to provide substantially simultaneous connection of the capacitors 17 to the line. Operation of all the switches 18 connects all three capacitors 17 in series with each other and in series with the oil circuit breaker 15 across conductors 11 and 12.

In a similar manner, each individual capacitor 19 of the third step of capacitors to be switched is connected in a series circuit with a capacitor 14 of the first step and a relatively low voltage switch 20 identical to a switch 18. Of course after step two is switched, a capacitor 19 and a switch 20 are in a series circuit with the parallel arrangement of a capacitor 14 and a capacitor 17. The switches 20 of the third step are similarly ganged and interrupt current at a voltage only $1/n$ times the line voltage. Operation of all switches 20 connects all three capacitors 19 in series with each other and in series with the oil circuit breaker in shunt to the power line comprising conductors 11 and 12. Thus all three steps of the bank 10 are connected in shunt to the line with only a single circuit breaker insulated for full line voltage.

It will be understood that in an actual capacitor bank, there will usually be a relatively large number of capacitors connected in parallel with each of the individual capacitors 14, 17, and 19 and that each of the capacitors would be individually fused. These details have been omitted from Fig. 1 in order to simplify the drawing and are illustrated in Fig. 2 which is a circuit diagram of the preferred embodiment of the invention in a polyphase system.

The low voltage switches 18 and 20 are preferably of the type having latch trip, or snap action, contacts immersed in an insulating dielectric. Because of the relatively low voltage at which they interrupt capacitor current, the switches 18 and 20 can be constructed with relatively low voltage insulation and at a cost which is only a minor fraction of that of the oil circuit breaker 15. Further, the switches 18 and 20 are preferably of the type which can be actuated either mechanically through an operating handle or electrically through a remote control operating coil. A switch suitable for the purposes of the invention is disclosed in U.S. Patent 2,671,141 to William J. Weinfurt, entitled "Switch Operating Means" having the same assignee as the present invention.

Figure 2:
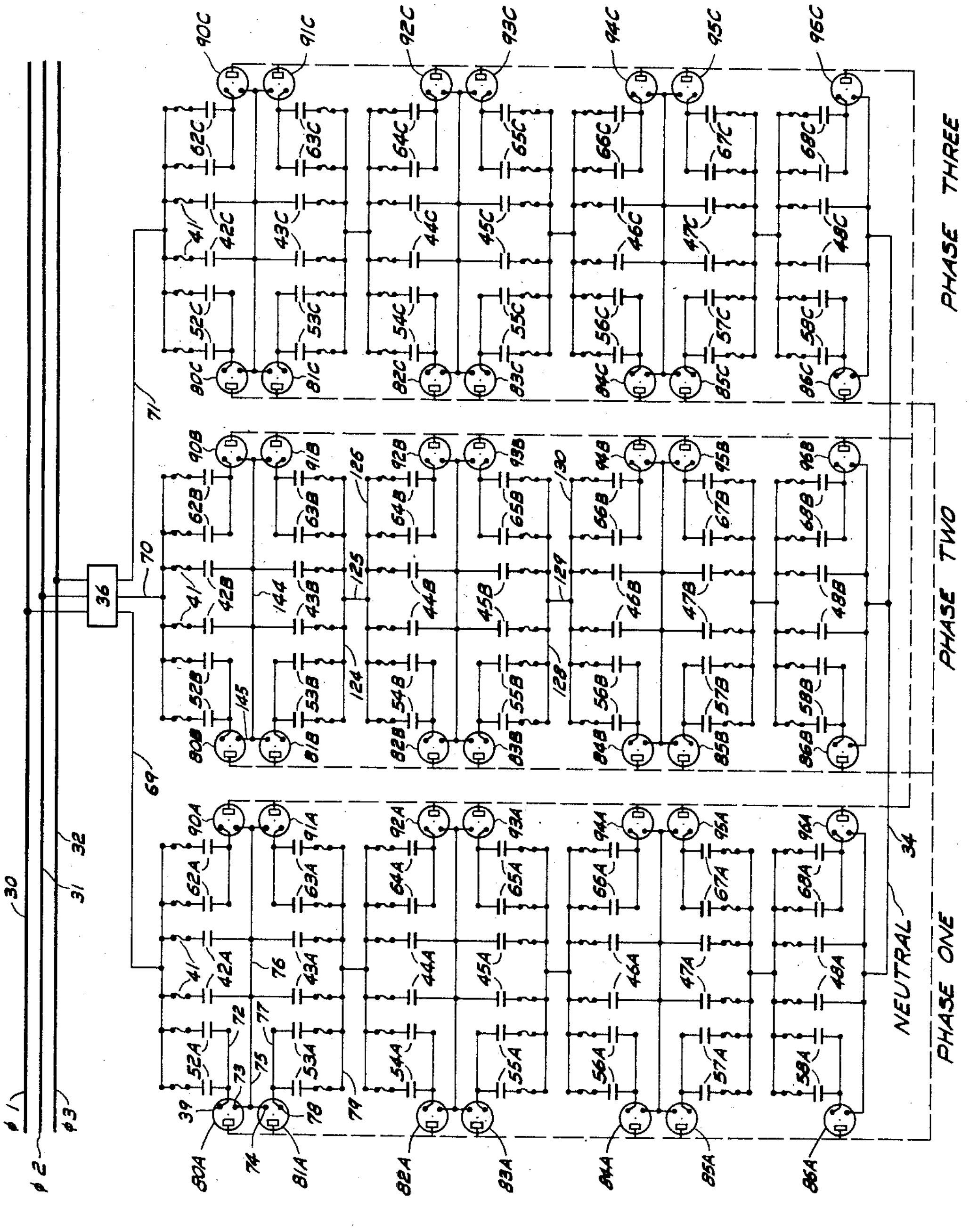
Fig. 2 is a circuit diagram of the preferred embodiment of the invention in a polyphase power system.

Fig. 2 is a circuit diagram of a polyphase power system embodying the voltage divider principle schematically illustrated in Fig. 1 to permit switching a capacitor bank in a plurality of steps with only a single circuit breaker having insulation of the line voltage rating. The conductors 30, 31, and 32 are the line conductors of phase one, phase two, and phase three respectively of a 46 kilovolt polyphase alternating current power system. A 15,750 kvar capacitor bank comprising 630 individual capacitors of 25 kvar rating is to be connected in shunt to the power system. The 630 capacitors are divided into three steps, each having a total rating of 5250 kvar, of which $5250/3=1750$ kvar is connected per step to each phase of the power system. In the circuit diagram of Fig. 2 the capacitors to be connected in three equal steps to phase one comprise the one third of the bank on the left of the drawing, the capacitors to be connected to phase two comprise the middle one third of the bank, and the capacitors to be connected to phase three comprise the one third on the right of the diagram. It will be noted in Figs. 3 and 5 that a separate supporting framework 100 is provided for mounting the 210 capacitors of each phase.

All of the capacitors are individually fused. The 630 capacitors are connected in sixty-three groups of ten parallel capacitors per group. In each phase seven serially connected groups of ten parallel capacitors are connected between the corresponding line conductors 30, 31, or 32 and the neutral 34 in each step of the capacitor bank. The illustration of all 630 capacitors and fuses would unnecessarily complicate the circuit diagram of Fig. 2, and only two capacitors of each group of ten parallel capacitors are illustrated. It will be understood that each capacitor shown represents five capacitors of the actual capacitor bank illustrated in Figs. 3 to 11.

Figure 3:
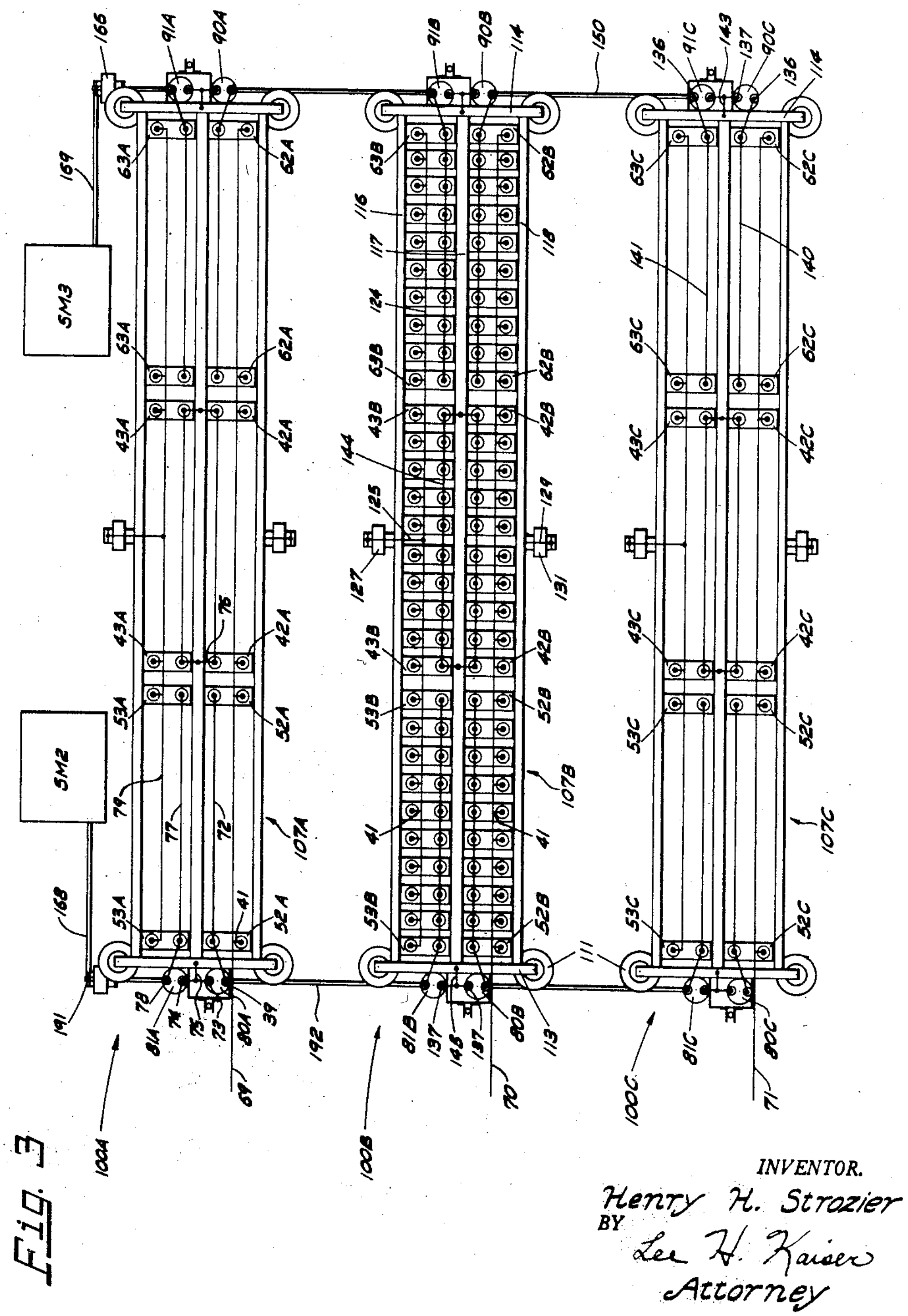
Fig. 3 is a plan view of the capacitor bank of the preferred embodiment of the invention and having incorporated therein means for mechanically accomplishing gang operation of the low voltage switches.

The first step of all three phases of the capacitor bank is switched by the circuit breaker 36 at full phase to neutral voltage, i.e., $46/\sqrt{3}=$approximately 26.8 kilovolts. The capacitors 42–48 of step one switched by the oil circuit breaker 36 as illustrated in Fig. 2 are the middle fourteen capacitors of each phase of the bank. The 210 capacitors 42–48 of the actual capacitor bank switched by the circuit breaker 36 in step one are shown in Figs. 3 and 4 in the middle one third of the supporting frameworks 100 for the capacitors.

Throughout the specification identical parts in the three phases are given identical reference numerals, and the letters A, B, and C indicate that the part is in phase one, phase two, or phase three respectively. As illustrated in Fig. 2, fourteen capacitors (representing 70 capacitors of the actual capacitor bank) of the first step of phase one are arranged in seven serially connected groups of capacitors 42A–48A. Each capacitor 42A–48A is connected in series with an individual fuse 41. The capacitors of each group are connected in parallel, e.g., capacitors 42A are connected in parallel and capacitors 46A are connected in parallel, and the seven groups of capacitors 42A–48A are permanently connected in series with each other. The seven serially connected groups of capacitors of the first step of phase one are permanently connected to the neutral 34 and by conductor 69 to a contact of circuit breaker 36.

As illustrated in Fig. 2, fourteen capacitors of the first step of phase two are similarly arranged in seven serially connected groups of capacitors 42B–48B. Each capacitor 42B–48B is connected in series with an individual fuse 41. The capacitors of each group are connected in parallel, e.g., capacitors 43B are in parallel and capacitors 47B are in parallel, and the seven groups of capacitors 42B–48B are permanently connected in series with each other and to the neutral 34 and further connected to a contact of the circuit breaker 36 by a conductor 70. The capacitors of the first step of phase three are identically arranged in seven serially connected groups of capacitors 42C–48C. Each capacitor 42C–48C is connected in series with an individual fuse 41 and the capacitors of each group are in parallel, e.g., capacitors 44C are in parallel and capacitors 48C are connected in parallel, and the seven groups of capacitors 42C–48C are permanently connected in series with each other and to the neutral 34 and further connected by a conductor 71 to a contact of the circuit breaker 36.

Operation of circuit breaker 36 connects the seven serially arranged groups of capacitors 42A–48A of phase one across conductor 30 and neutral 34, connects the seven serially arranged groups of capacitors 42B–48B of phase two between conductor 31 and neutral 34, and connects the seven serially arranged groups of capacitors 42C–48C of phase three between conductor 32 and neutral 34. Operation of circuit breaker 36 thus connects the first step of 210 capacitors of the actual bank in star to the power circuit.

All three phases of the capacitor bank are identical and only phase one will be described in relation to the switching of step two and step three of the bank. Step two of phase one includes seven groups of capacitors 52A–58A. Each capacitor 52A–58A is in series with an individual fuse 41. The capacitors of each group are connected in parallel, e.g., capacitors 52A are connected in parallel and capacitors 56A are connected in parallel. The seven groups of paralleled capacitors 52A–58A of step two of phase one represent seventy capacitors of the actual bank which are illustrated on the left of the phase one supporting framework 100A in Fig. 3. The conductor 69 is common to the fuses 41 of the capacitors 42A, 52A, and 62A of phase one. All terminals on the unfused side of paralleled capacitors 52A are commoned by a conductor 72 (see Figs. 2 and 3) and connected to a contact 39 of a low voltage switch 80A having the opposite contact 73 thereof connected to one contact 74 of a switch 81A and also connected by conductors 75 and 76 to the terminal at the unfused side of capacitors 42A of the first step. In the actual capacitor bank shown in Fig. 3 the switch contacts 39, 73, 74, and 78 cannot be seen, and the conductors 72, 75, and 77 are shown connected to insulating bushings leading to the corresponding switch contacts, the bushings being identified by the reference numeral of the corresponding contact. The bushings corresponding to contacts 73 and 74 are connected to the metal of the rack 107A of the framework 100A by the conductor 75 as shown in Fig. 3, and the conductor 76 which is common to the terminals on the unfused side of all the capacitors 42A and 43A is connected to the metal of the rack 107A at a point spaced from the connection of the conductor 75. As described hereinbefore, the capacitors 42A are connected in series with the groups of capacitors 43A–48A between conductor 30 and the neutral 34, and the voltage drop across the paralleled capacitors 42A is only $$\frac{46}{7\times\sqrt{3}}$$

=approximately 3.8 kilovolts. Operation of switch 80A electrically connects contacts 39 and 73 (see Fig. 2) to connect capacitors 52A in parallel with the capacitors 42A of the first step. Thus, switch 80A interrupts the current of capacitors 52A of phase one at only 3.8 kilovolts and the insulation rating thereof can be considerably less than that of the circuit breaker 36. It will be appreciated that the switch 80A interrupts the current to capacitors 52A without danger of restriking or abnormal stress of the switch dielectric.

A conductor 77 connects the unfused side of capacitors 53A to a contact 78 of switch 81A, and a conductor 79 commons the fuses 41 of all the capacitors 43A, 53A, and 63A of phase one. The paralleled capacitors 53A are thus in a series circuit with the switch 81A and the paralleled capacitors 43A, and operation of switch 81A carries contacts 74 and 78 to engage and connect the capacitors 53A in parallel with the already energized capacitors 43A at a voltage which is only 1/7 of the phase to neutral voltage. It will be appreciated that after after switches 80A and 81A are operated, the group of paralleled capacitors 52A is in series with the group of paralleled capacitors 53A. In a similar manner five additional groups of paralleled capacitors 54A–58A are arranged in individual series circuits with the paralleled groups of capacitors 44A–48A respectively of step one, and switches 82A–86A connect the paralleled capacitors 54A–58A in shunt with capacitors 44A–48A respectively at potentials which are only 1/7 of the voltage between phase one, conductor 30, and neutral 34, i.e., at approximately 3.8 kilovolts.

Switches 80A–86A are ganged, and it will be appreciated that the operation of these seven switches connects the seven groups of parallel capacitors 52A–58A in series with each other and in series with circuit breaker 36 across the phase one conductor 30 and the neutral 34 to switch the second step of phase one of the capacitor bank in shunt to the power system. Each of the switches 80A–86A switches at only 1/7 of the total phase to neutral voltage and can consequently be of relatively inexpensive construction in comparison to circuit breakers which heretofore switched each step at full system voltage. Seven ganged switches 80B–86B in an identical manner accomplish switching of seven groups of parallel capacitors 62B–58B of step two of phase two in shunt to the individual groups 42B–48B of the first step switched by the circuit breaker 36. The groups of paralleled capacitor 52B–58B are thus connected in series with each other and in series with the circuit breaker 36 across phase two conductor 31 and the neutral 34. The second step of phase three comprising seven groups of paralleled capacitors 52C–58C is switched in an identical manner by ganged switches 80C–86C. All twenty-one switches 80–86 are ganged to provide substantially simultaneous connection of the capacitors of step two of each phase to the power system. In the actual capacitor bank illustrated in Figs. 3 to 5, gang operation of twenty-one switches is accomplished to connect 210 capacitors of the second step to the power line.

Step three is switched in a manner identical to step two by twenty-one ganged switches, seven switches 90A–96A in phase one switching the seven groups of parallel capacitors 62A–68A, respectively; seven switches 90B–96B being in phase two and switching the seven groups of parallel capacitors 62B–68B respectively; seven switches 90C–96C being in phase three and switching the seven groups of parallel capacitors 62C–68C respectively. Each switch is effective to connect a group of parallel capacitors in shunt to one of the groups of ten parallel capacitors switched by the first step. For example, operation of switch 91C connects the parallel capacitors 63C of step three in shunt to the parallel capacitors 43C of step one at a voltage which is only 1/4 of the phase to neutral voltage.

Figure 4:
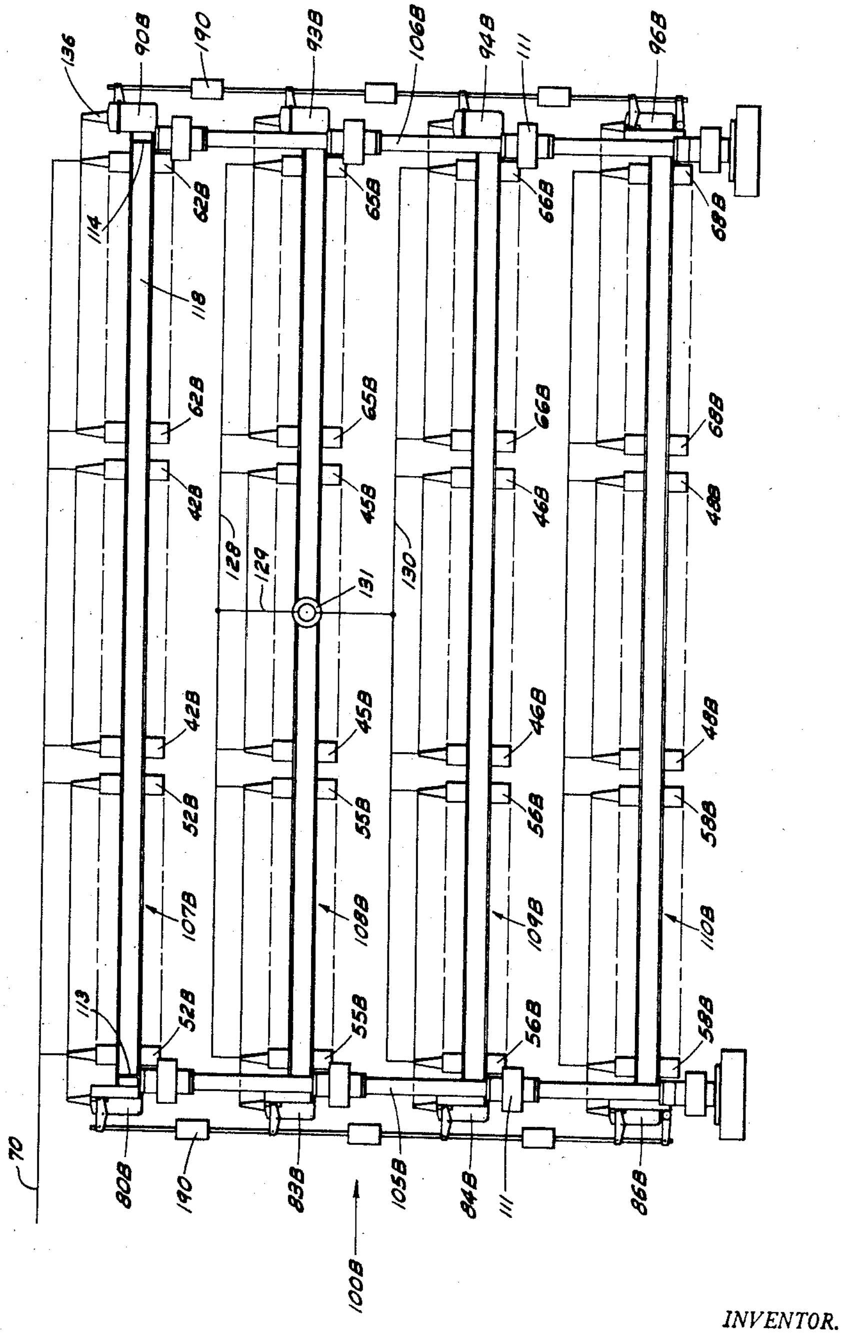
Fig. 4 is a front elevation view of phase two of the capacitor bank shown in Fig. 3.
Figure 5:
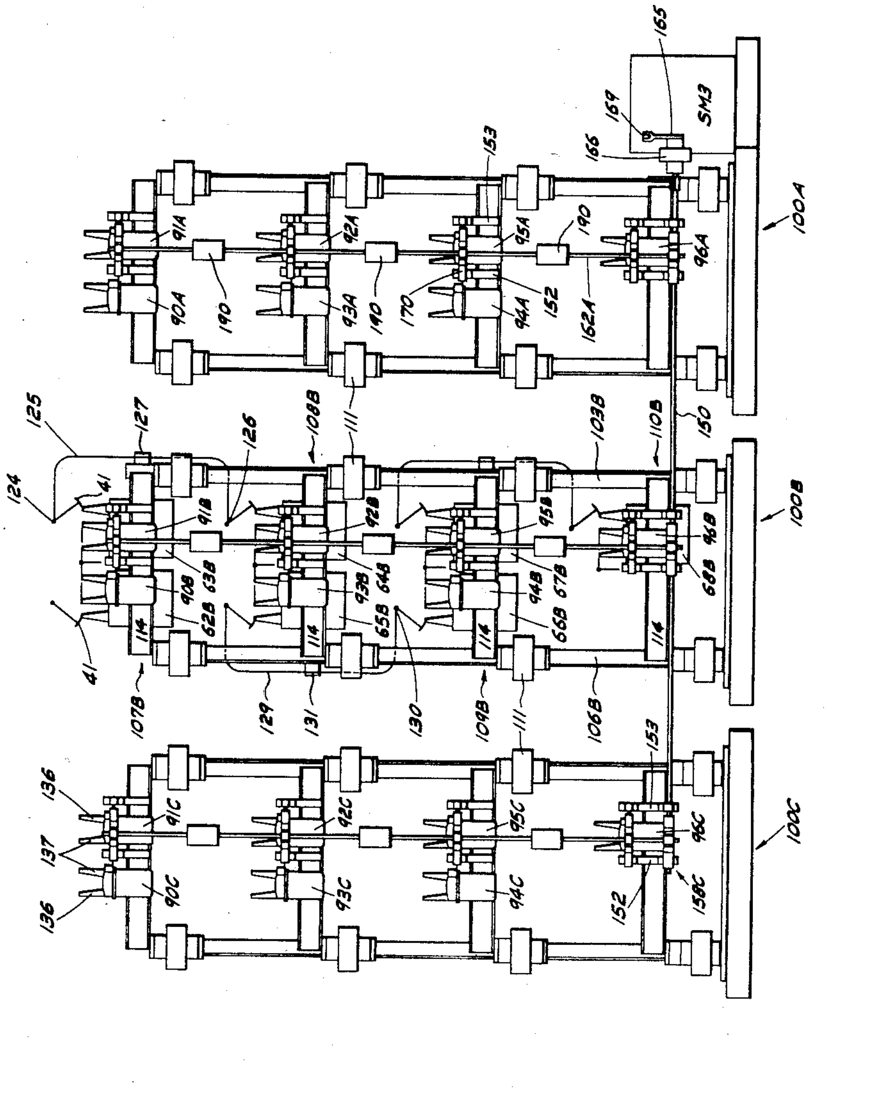
Fig. 5 is a right end elevation view of the capacitor bank of Fig. 3.

Figs. 3, 4, and 5 illustrate the capacitor bank of the preferred embodiment of the invention. Individual supporting frameworks 100A, 100B, and 100C are provided for the capacitors of phase one, two and three respectively. The supporting frameworks for all three phases are identical, and only supporting framework 100B of phase two will be described. The framework 100B comprises four vertical posts 103B–106B at the corners thereof which support four levels, or racks, 107B–110B. The vertical posts 103B–106B are divided into sections insulated from each other by insulators 111 of eight kilovolt rating disposed in horizontal planes between the racks 107B–110B and between the bottom rack 110B and the foundations on which the framework 100B is supported.

The four racks 107–110 of each supporting framework 100 are identical and only one will be described. The rack 107 B includes two horizontal channel iron end pieces 113 and 114 extending transversely thereof and welded to and connecting the vertical posts 104B and 105B and the vertical posts 103B and 106B respectively. Three horizontal, channel iron support bars 116, 117, and 118 extending the length of the rack 107B are spaced from each other and welded at their ends to the pieces 113 and 114. Each rack 107–109 supports two parallel rows of thirty capacitors.

The sixty capacitors supported in the top rack 107B of the framework 100B of phase two include the twenty capacitors 42B and 43B of the first step, the twenty capacitors 52B and 53B of the second step, and the twenty capacitors 62B and 63B of the third step of phase two. The sixty capacitors are supported directly on the channel iron support bars 116, 117 and 118.

The sixty capacitors of phase two supported on the second rack 108B from the top of the framework 100B includes twenty capacitors 44B and 45B of the first step disposed in the middle of the length of the rack 108B, twenty capacitors 54B and 55B of the second step disposed at the left end of the rack 108B, and the twenty capacitors 64B and 65B disposed at the right end of the rack 108B. The bottom rack 110B supports only ten capacitors 48B of the first step at the middle thereof, ten capacitors 58B of the second step at the left end thereof, and ten capacitors 68B of the third step at the right end thereof. The bottom racks 110 of the supporting frameworks 100 of all three phases are at the potential of the neutral conductor 34.

The maximum potential difference between the capacitors at the top rack 107 and the bottom rack 110 is approximately $\sqrt{48}/\sqrt{3}=26.8$ kilovolts, e.g., conductor 70 connected to capacitors 42B, 52B, and 62B is at the potential of line conductor 31 while capacitors 48B, 58B, and 68B are connected to the neutral 34. The insulators 111 in the vertical posts 103–106 insulate between the racks 107–110 of the supporting frameworks 100.

The terminals at the fused side of capacitors 43B, 53B, and 63B of phase two supported on the top rack 107B are commoned by a conductor 124 and connected by a conductor 125 to a wire 126 which commons the terminals at the fused side of capacitors 44B, 54B, and 64B supported on the rack 108B next below the top rack, and an insulator 127 of 7.5 kilovolt rating insulates the conductor 125 from the channel 116. Similarly the capacitors 45B, 55B, and 65B supported on the rack 108B are commoned by a conductor 128 and connected by a conductor 129 to a conductor 130 which commons the terminals at the fused side of capacitors 46B, 56B, and 66B supported on the next lower rack 109B, and an insulator 131 of 7.5 kilovolt rating insulates the conductor 129 from the outer channel support bar 118 of the rack 108B. Similar insulators are provided between the racks of the supporting frameworks of all the phases.

The low voltage switch 90B for connecting the capacitors 62B and the low voltage switch 91B for switching the capacitors 63B are mounted on the end piece 114. Similarly the low voltage switches 80B and 81B for switching the capacitors 52B and 53B respectively are mounted on the end piece 113 at the opposite end of the rack 107B. Two low voltage switches are similarly mounted on each end piece 113 and 114 of the top three racks 107–109 of the supporting framework 100 of each phase, and only a single low voltage switch is mounted on each end piece 113 and 114 of the lower rack 110 of each phase.

Figures 6, 7:
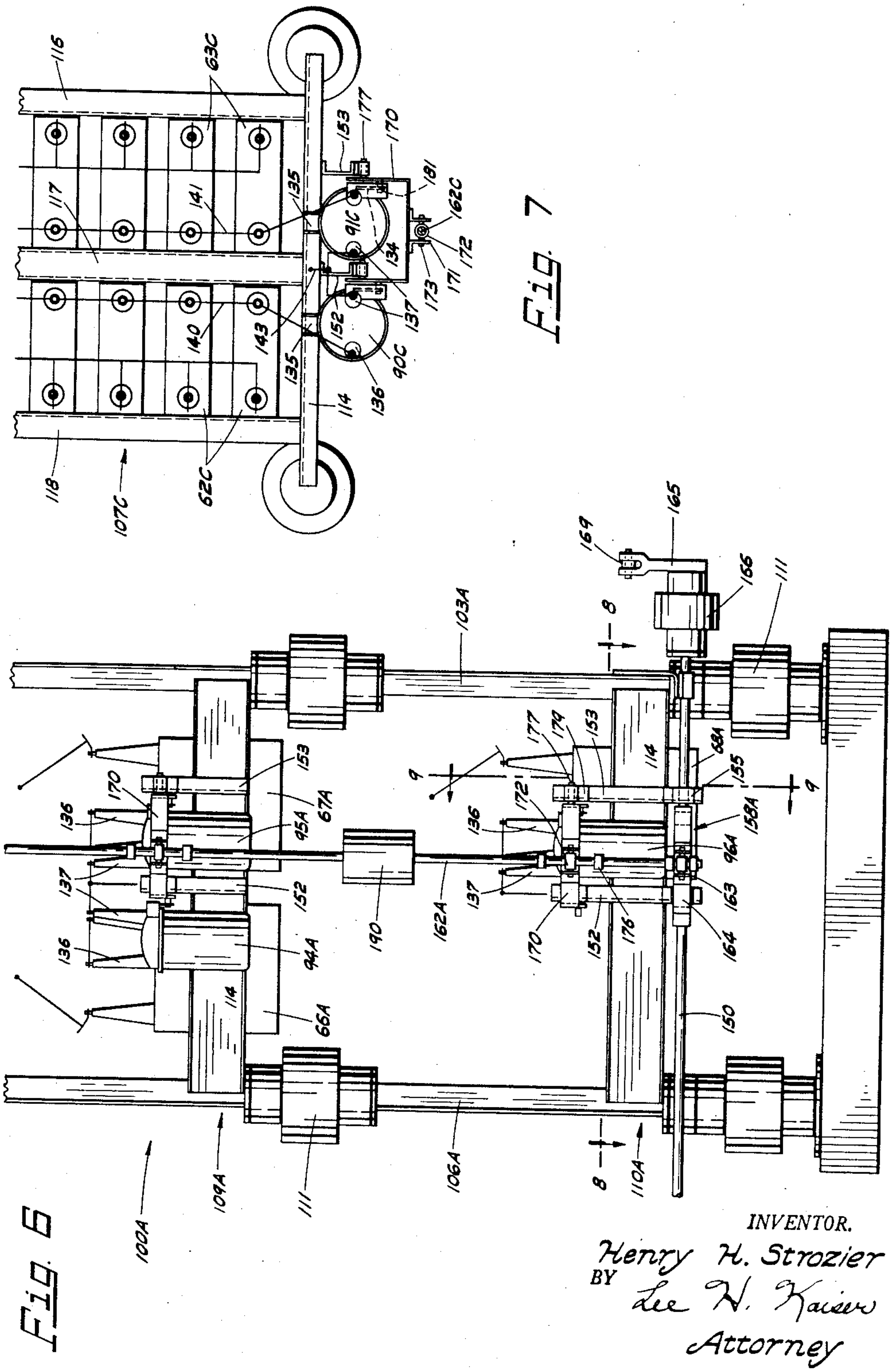
Fig. 6 is an enlarged partial view of supporting framework 100A shown in Fig. 5.
Fig. 7 is a partial plan view of phase three of the capacitor bank shown in Fig. 3.
Figures 8, 9, 10, 11:
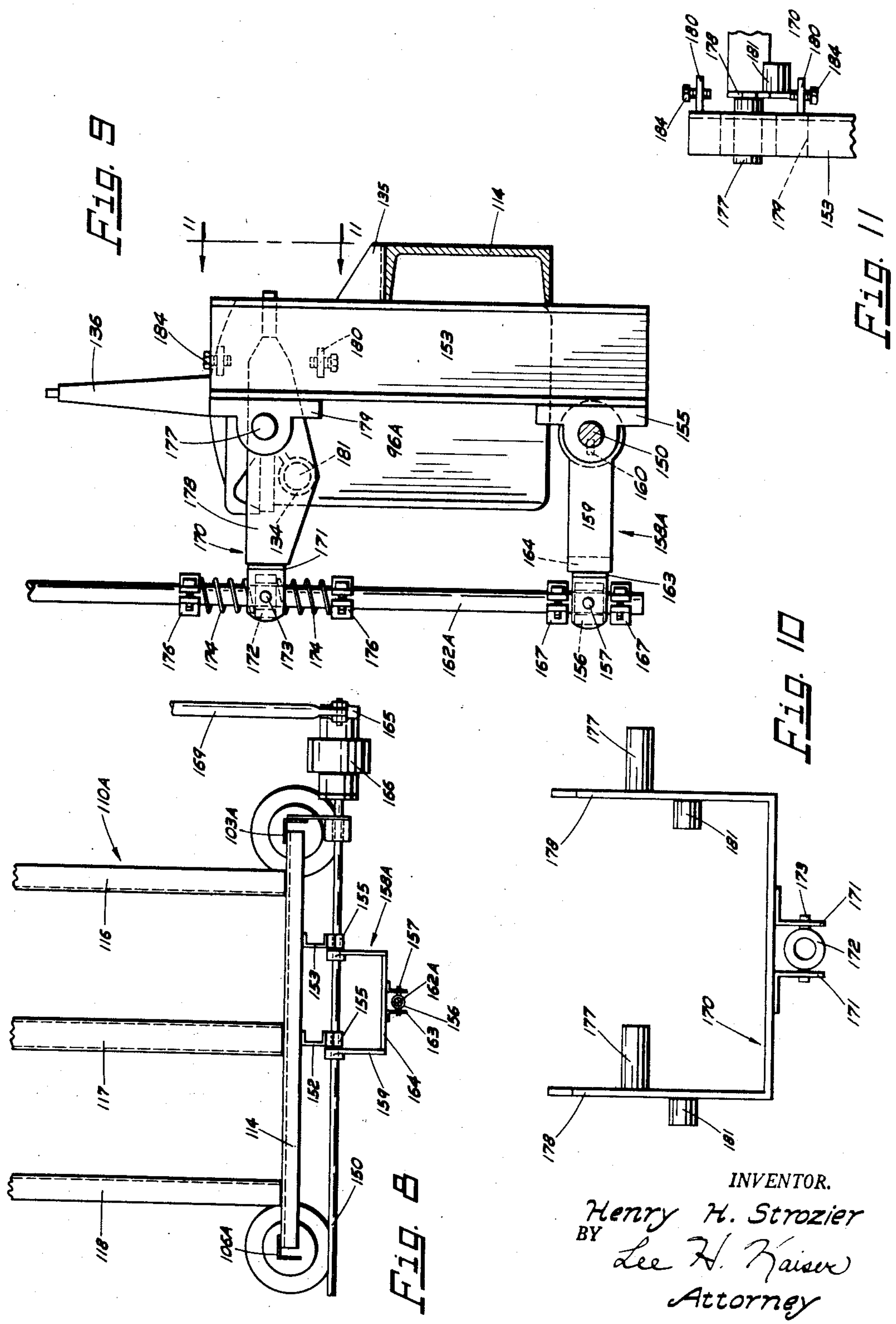
Fig. 8 is a partial horizontal section view taken on line 8—8 of Fig. 6.
Fig. 9 is a partial vertical section view taken on line 9—9 of Fig. 6.
Fig. 10 is a plan view of an operating yoke for mechanically actuating two low voltage switches at one end of a capacitor rack.
Fig. 11 is a vertical view taken on line 11—11 of Fig. 9.

As discussed hereinbefore, each low voltage switch is preferably of the type having latch trip, or snap action, contacts immersed in an insulating dielectric and adapted to be actuated either electrically by a remote control operating coil or mechanically by an operating handle 134 (see Figs. 7 and 9). Low voltage switches 80–86 and 90–96 similar to the switch disclosed in U.S. Patent 2,671,141 to William J. Weinfurt, entitled "Switch Operating Means" having the same assignee as the present invention are suitable for the purpose and are illustrated in Figs. 3 to 7, 9, and 10. The construction of such a low voltage switch is not essential to the present invention and the description thereof would unnecessarily lengthen the present application. Each low voltage switch 80–86 and 90–96 is mounted on a bracket 135 secured to an end piece of the rack as best seen in Fig. 7 which shows switches 90C and 91C mounted on brackets 135 which are supported on end piece 114. Fig. 9 includes an enlarged view of a low voltage switch 96A mounted on a bracket 135 which is supported on end piece 114 of lower rack 110A.

Insulating bushings 136 and 137 of the porcelain type extending through the cover of each low voltage switch 80–86 and 90–96 isolate the leads to the dielectric immersed contacts from the switch casing. The conductor connected to the bushing 136 of each low voltage switch is common to the unfused terminals of ten parallel capacitors, e.g., the conductor 140 (see Fig. 3) connected to bushing 136 of low voltage switch 90C is common to one terminal of all capacitors 62C and the conductor 141 connected to bushing 136 of low voltage switch 91C is common to one terminal on the unfused side of all condensers 63C. The conductors from the bushings 137 of the two adjacent low voltage switches on each end of each rack are electrically connected to the end piece on which they are mounted, for example, the conductors 143 connected to the insulating bushings 137 of low voltage switches 90C and 91C are connected to the end piece 114 as seen in Figs. 3 and 7. One contact of each low voltage switch 80–86 and 90–96 is thus at the potential of the rack on which it is mounted. As explained hereinbefore, this connection to the metal of the framework is part of the electrical circuit for connecting the groups of capacitors in parallel, for example, as illustrated in Fig. 3, conductor 144 in phase two commons the terminals at the unfused side of capacitors 42B and 43B and is electrically connected to the horizontal support bar 117. Conductor 145 electrically connects the end piece 113 to the bushings 137 of switches 80B and 81B, and operation of switches 80B and 81B connects capacitors 52B and 53B in shunt with capacitors 42B and 43B respectively.

In one embodiment of the invention, means are provided for mechanically gang operating twenty-one low voltage switches 80–86, including seven switches in each phase, to accomplish switching of step two of the capacitor bank to the power line. Step three is similarly switched by mechanical gang operation of twenty-one low voltage switches 90–96. In step two, the seven switches 80A–86A mounted at the left end of framework 100A, the seven switches 80B–86B at the left end of framework 100B, and the seven switches 80C–86C at the left end of framework 100C are gang operated. In step three the seven switches 90A–96A mounted at the right end of framework 100A, the seven switches 90B–96B mounted at the right end of framework 100B, and the seven switches 90C–96C mounted at the right end of framework 100C are gang operated. The means for mechanically accomplishing gang operation of the switches of steps two and three are identical and only step three will be described.

The lower racks 110 of all three frameworks 100 are at the potential of the neutral 34, permitting connection thereof by a main shaft 150. A pair of vertical channel members 152 and 153 are welded in spaced apart position to each end piece 113 and 114 of each rack. The members 152 and 153 welded to the end pieces of the lower rack 110 of each phase have bearings 155 affixed thereto which rotatably support the main shaft 150. U-shaped main operating cranks 158A, 158B, and 158C for phases one, two, and three respectively are keyed to the main operating shaft 150 between the members 152 and 153 which are secured to the end pieces 114 of the lower racks 110. The main operating crank of each phase is pivotally connected to a vertical operating rod which is adapted, upon rotation of the main shaft 150, to accomplish gang operation of seven low voltage switches of the corresponding phase. The means for actuating the vertical operating rods of the three phases, and the means actuated by the rods to accomplish gang operation of the low voltage switches of the three phases, are identical and only the apparatus for phase one will be described.

The ends of the legs 159 of the U-shaped main operating crank 158A of phase one are apertured to receive the main shaft 150. The main shaft 150 is affixed to the crank 158A by a key 160 (see Fig. 9). One end of a vertical operating rod 162A fits between spaced apart lugs 163 welded to the crosspiece 164 of the main operating crank 158A. An annular member 156 adapted to receive the vertical operating rod 162A with clearance has diametrically opposed, radially extending ears 157 which project through registering apertures provided in the spaced apart lugs 163. The annular member 156 reacts against spaced apart collars 167 clamped on the vertical rod 162A on opposite sides of the annular member 156 to pivotally connect the vertical operating rod 162A to the main operating crank 158A. After the collars 167 are adjusted in position and clamped to the vertical operating rod 162A, transverse pins (not shown) are inserted into holes drilled through the collars 167 and the rod 162A.

A crank arm 165 is provided at the end of the main shaft 150 and is insulated therefrom by an insulator 166 of 7.5 kilovolt rating. The crank arm 165 may be actuated by any desired means such as a solenoid or pneumatic piston. The means for mechanically actuating the crank arm 165 is not essential to the invention and the details thereof will not be herein described.

Figures 12, 13:
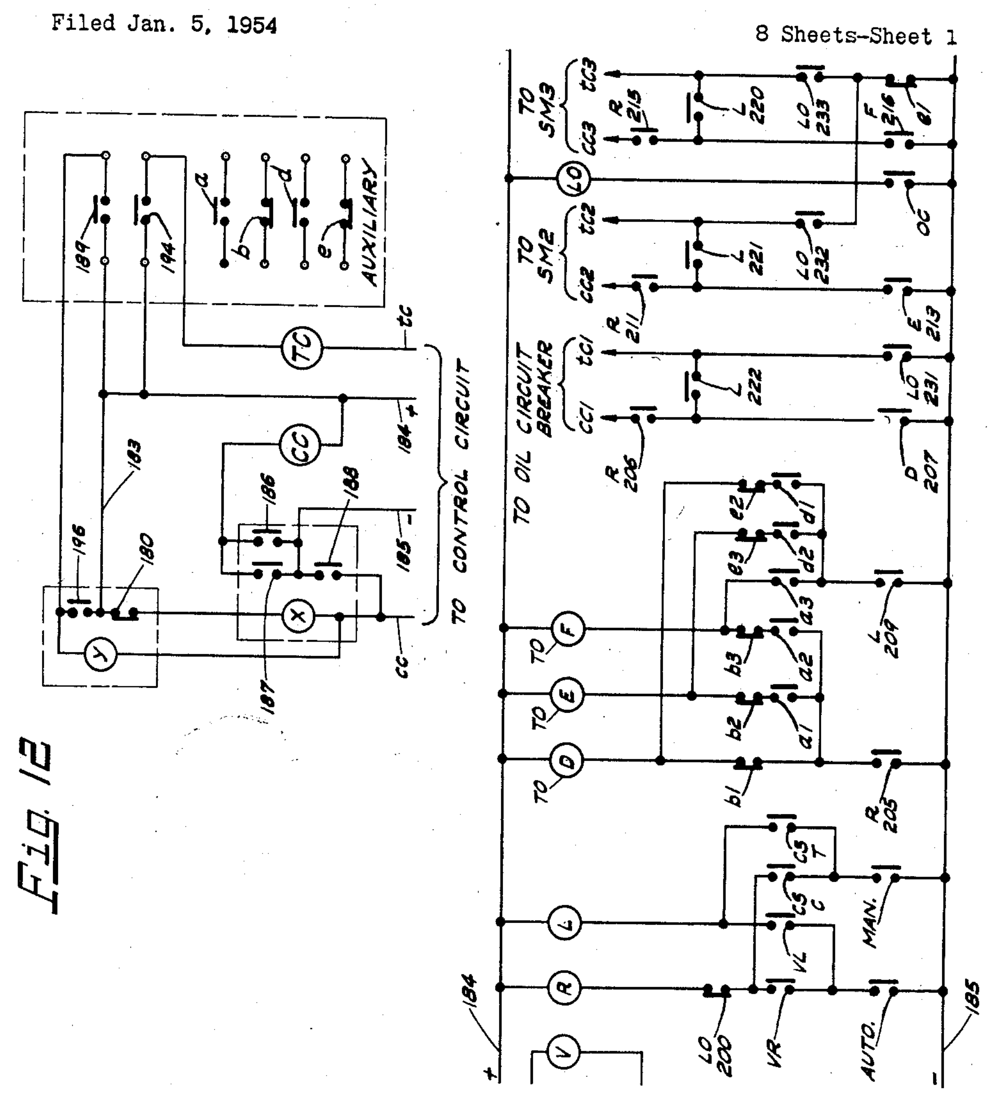
Fig. 12 is a simplified schematic circuit diagram of the oil circuit breaker and of the solenoid mechanisms for mechanically accomplishing gang operation of the low voltage switches.
Fig. 13 is a schematic circuit diagram of a control circuit which cooperates with the oil circuit breaker and two solenoid mechanisms for automatically controlling the switching of the capacitors of the preferred embodiment as a function of voltage.

In the embodiment illustrated in Figs. 3 to 13, solenoid operating mechanism SM2 adapted to actuate connecting rod 168 to gang operate twenty-one switches 80–86 of step two and solenoid operating mechanism SM3 adapted to actuate connecting rod 169 to gang operate twenty-one low voltage switches 90–96 of step three are shown only schematically. The schematic electrical circuit for the solenoid mechanism SM2 and the solenoid mechanism SM3 of the preferred embodiment is illustrated in Fig. 12 and discussed in detail hereinafter.

A U-shaped operating yoke 170 is pivotally secured to the vertical operating rod 162A approximately at the level of the operating lever 134 of each low voltage switch as shown in detail in Figs. 6, 7, 9, and 10. Four vertically spaced operating yokes 170 are thus pivotally secured to the vertical operating rod 162 of each phase. Each U-shaped operating yoke 170 has a pair of spaced apart lugs 171 welded to the crosspiece thereof. An annular member 172 adapted to receive a vertical operating rod 162 with clearance has diametrically opposed radially extending ears 173 which pivotally project into registering apertures in the spaced apart lugs 171. Resilient helical springs 174 (see Fig. 9) circumjacent the operating rod 162 react between the annular member 172 and vertically spaced apart collars 176 clamped and pinned to the rod 162 on opposite sides of the annular member 172. The springs 174 are not illustrated in Fig. 6. The operating yoke 170 pivots about horizontal lugs 177 affixed to the legs 178 thereof and extending within bearings 179 secured to the vertical channel members 152 and 153.

Horizontally extending ears 181 secured to the legs 178 of the U-shaped yoke 170 away from the pivot pins 177 project into an eye provided in the end of the operating handles 134 of the low voltage switches 80–86 and 90–96. Rotation of the main shaft 150 effects vertical movement of the operating rod 162 which is transmitted by the resilient springs 174 to the operating yoke 170, causing it to pivot about the lugs 177 and actuate the operating handle 134 of the low voltage switch. As seen in Figs. 9 and 11, stops 180 welded to the vertical channel 153 in the path of travel of the end of the legs 178 of the U-shaped operating yoke 170 limit the angular rotation of the yoke and thus prevent damage to the low voltage switches 80–86 and 90–96. Screws 184 threadably engaging the stops 180 permit adjustment of the angle through which the operating yoke 170 can pivot. The resilient springs 174 circumjacent the vertical operating rod 162 permit overtravel of the rod 162 without damage to the operating yoke 170 or the low voltage switches 80–86 and 90–96. Insulators 190 of eight kilovolt rating divide the operating rod 162 into sections to insulate between the racks 107–110.

Movement of the crank arm 165 actuates the vertical operating rods 162 of all three phases simultaneously and through the operating yokes 170 accomplishes gang operation of all twenty-one low voltage switches of step three. Switching of step two is accomplished by gang operation of all twenty-one low voltage switches 80–86 mounted on the left end of the three supporting frameworks 100 in a manner identical to step three and is not described. The apparatus for gang operating the twenty-one low voltage switches of step two includes solenoid mechanism SM2 which is adapted to actuate connecting rod 168 and pivot crank arm 191 to rotate the main shaft 192 mounted on the left end of the frameworks 100.

The oil circuit breaker 36 and the solenoid operating mechanisms SM2 and SM3 have the same circuit diagram which is illustrated schematically in Fig. 12. All three devices 36, SM2, and SM3 have a principal solenoid which is operated upon energization of its "close coil" CC and released upon energization of its "trip coil" TC, and the three devices will hereinafter be referred to as "solenoid mechanisms." In the oil circuit breaker 36, this principal solenoid operates the oil-immersed main contacts, whereas the principal solenoids of the mechanisms SM2 and SM3 are adapted to actuate the connecting rods 168 and 169 respectively to accomplish mechanical gang operation of twenty-one low voltage switches of the corresponding step. Each solenoid mechanism has a plurality of auxiliary contacts *a*, *b*, *d*, *e*, 189, and 194 which are also operated when the close coil CC is energized and which are released when the trip coil TC is energized.

Only the circuit diagram for the oil circuit breaker 36 will be described, the operation of the other solenoid mechanisms SM2 and SM3 being similar thereto. The numerals following parts given alphabetical designations denote the solenoid mechanism corresponding to the step of the capacitor bank, e.g., *a*1 is a member in the oil circuit breaker 36 whereas the identical member of solenoid mechanism SM3 is designated *a*3.

The control circuit of Fig. 13 cooperates with the oil circuit breaker 36 and the solenoid mechanisms SM2 and SM3 to automatically control the switching of the three steps of the capacitor bank as a function of the voltage of the system. A common power supply is utilized for the control circuit of Fig. 13 and the circuit diagrams of solenoid mechanisms 36, SM2, and SM3 which are identical and shown in Fig. 12. When the voltage of the system falls below the lower limit of the band width, the negative side of the power supply is connected to the lead *cc*1 on the control circuit. Energization of the close coil lead *cc* completes a circuit to the coil of relay X through the normally closed contacts 180 of auxiliary relay Y and conductor 183 to the positive lead 184 from the power supply. The relay called "X" in switch gear terminology is normally interposed between the control circuit and the close coil CC which actuates the main circuit breaker contacts. The close coil CC is designated for intermittent duty only, and to prevent overheating, a "Y" relay operated by an auxiliary set of contacts releases the X relay, thus opening the circuit to the main solenoid close coil CC as soon as the main breaker is closed. Because of the large current drawn by the coil CC, two sets of paralleled contacts 186 and 187 are used on the X relay to actuate the close coil CC.

*Relay X operates*

Closes paralleled contacts 186 and 187 to connect the close coil CC across the leads 184 and 185 from the power supply; and Closes contacts 188 to lock one side of its coil to the negative lead 185 from the power supply.

*Oil circuit breaker 36 operates*

Closes its main contacts (not shown) to connect conductors 69, 70, and 71 to phase conductors 30, 31, and 32 respectively;

Closes auxiliary contacts 189 to complete an energizing circuit to the coil of auxiliary relay Y; and Closes auxiliary contacts 194 to connect the trip coil TC to the positive lead 184 from the power supply.

The functions performed by the remaining auxiliary contacts *a*1, *b*1, *d*1, and *e*1, operated by the close coil CC of the circuit breaker 36 are discussed in detail hereinafter in the description of the control circuit of Fig. 13.

*Relay Y operates*

Closes contacts 196 to lock its coil to lead 184 from the positive side of the power supply; and Opens its contacts 180 to release relay X.

*Relay X releases*

Separates contacts 186 and 187 to open the circuit to the close coil CC.

When the voltage has raised sufficiently to remove the first step of capacitors from the bank, the negative lead from the power supply is connected to the *tc* lead in the control circuit of Fig. 13, which energizes the trip coil TC through auxiliary contacts 194 to release both the main contacts and the auxiliary contacts of the oil circuit breaker 36.

*Oil circuit breaker releases*

Opens its main contacts to disconnect conductors 69, 70, and 71 from phase conductors 30, 31, and 32 respectively to disconnect the capacitor bank from the power system; and Separates auxiliary contacts 189 to open the energizing circuit to the coil of relay Y.

Fig. 13 is a schematic circuit diagram of a control circuit which cooperates with the oil circuit breaker 36 and the solenoid operating mechanism SM2 and SM3 to automatically control the switching of the three steps of the capacitor bank in accordance with the system voltage. As explained hereinbefore, numerals 1, 2, and 3 following alphabetical designations denote parts in the circuit breaker 36, the solenoid mechanism SM2, and the solenoid mechanism SM3 respectively. V is a contact making voltmeter energized from the power system including conductors 30, 31, and 32 to which the steps of the capacitor bank are to be connected. The system voltage is to be maintained within a "band width" having an upper limit which is a predetermined magnitude above the nominal voltage, and a lower limit which is a predetermined magnitude below the nominal voltage. V has a pair of normally open contacts VR which are closed when the system voltage falls below the lower limit and a pair of normally open contacts VL which are closed when the system voltage rises above the upper limit. It will be appreciated that methods other than voltage control can be utilized for switching capacitors, e.g., kilovar control, current control, current modified voltage control, or power factor control, in which event the contact making voltmeter V is replaced by a contact making device responsive to the particular electrical characteristic which is to control the switching of the capacitors.

A manually controlled "selector" switch operable to either of two positions is actuated to close a pair of normally open "Auto" contacts when automatic control of switching is desired, and actuated to close a pair of normally open "Man" contacts when manual control of switching is desired. With Auto contacts engaged, closing of contacts VR of contact making voltmeter V, when the system voltage is below the lower limit, connects the coil of a "raise" relay R through contacts 200 of "lockout" relay LO across the supply conductors 184, 185 of the power supply.

*Relay R operates*

Closes contacts R205 to complete an energizing circuit to relay D through the normally closed auxiliary contacts *b*1 of the oil circuit breaker 36; and Closes contacts R206 to prepare an energizing circuit to "close coil" conductor *cc*1 to the oil circuit breaker 36.

Relays D, E, and F are of the slow-to-operate and slow-to-release thermal type having operate and release times of approximately five seconds and are designated "TO," which is an abbreviation of "time operation." After its operate time elapses,

*Relay D operates*

Closes its contacts D207 to connect conductor 185 from the negative side of the power supply to lead *cc*1 through contacts R206 and thus energize the close coil CC of oil circuit breaker 36.

The auxiliary contacts *a*, *b*, *d*, and *e* are illustrated in Fig. 13 as part of the control circuit, but it will be understood that these auxiliary contacts are located in the corresponding solenoid mechanism and that the conductors connecting the relays and the solenoid mechanism form the leads shown in Fig. 13. Separate *cc* and *tc* leads are shown to the solenoid mechanisms to emphasize that three circuits similar to Fig. 12 cooperate with Fig. 13.

*Oil circuit breaker 36 operates*

Closes auxiliary contacts *a*1 to prepare an energizing circuit for relay E;

Closes auxiliary contacts *d*1 to prepare an energizing circuit for relay D through contacts L209;

Opens auxiliary contacts *b*1 to release relay D;

Opens normally closed auxiliary contacts *e*1 to prevent energization of "trip coil" leads *tc*2 and *tc*3 if lockout relay LO operates; and Closes its main contacts (not shown) to connect capacitors 42–48 of the first step in shunt to the system conductors 30, 31, and 32.

If the system voltage is still below the lower limit, the contact making voltmeter V again closes its VR contacts to energize the coil of relay R.

*Relay R operates*

Closes its contacts 205 to complete a circuit to energize the coil of relay E through auxiliary contacts *a*1 of the oil circuit breaker and the normally closed auxiliary contacts *b*2 of solenoid mechanism SM2; and Closes contacts R211 to prepare a circuit to connect conductor 185 to lead *cc*2.

After its operate time elapses,

*Relay E operates*

Closes contacts E213 to connect conductor 185 from the negative side of the power supply to lead *cc*2 and thus energize the close coil CC of the solenoid mechanism SM2.

*Solenoid mechanism SM2 operates*

Actuates connecting rod 168 which rotates main shaft 192 at the left end of the supporting frameworks 100 to accomplish gang operation of the low voltage switches 80–86 of step two;

Closes auxiliary contacts *a*2 to prepare an energizing circuit for relay F;

Closes auxiliary contacts *d*2 to prepare an energizing circuit for relay E through contacts L209;

Opens auxiliary contacts *b*2 to release relay E; and

Separates auxiliary contacts *e*2 to open a circuit to relay D through contacts L209.

If the system voltage should rise above the upper limit, voltmeter V will close contacts VL to energize relay L. Relay L will close contacts L209 to complete a circuit to relay E through auxiliary contacts *d*2 and *e*3. Relay E in operating will close contacts E213 to connect the negative supply conductor 185 to the *tc*2 lead to energize the trip coil TC of solenoid mechanism SM2 and thus remove the capacitors of step two from the system.

Assume, however, that after step two has been connected to the system, the system voltage is still below the lower limit and causes voltmeter V to again close contacts VR.

*Relay R operates*

Closes contacts R205 to energize relay F through auxiliary contacts *a*2 of solenoid mechanism SM2; and Closes contacts R215 to prepare a circuit to operate solenoid mechanism SM3.

After its operate time elapses,

*Relay F operates*

Closes contacts F216 to connect negative voltage supply line 185 to close coil lead *cc*3 to energize the close coil CC of the solenoid mechanism SM3 through contacts R215.

*Solenoid mechanism SM3 operates*

Actuates crank shaft 165 through connecting rod 169 to gang operate the low voltage switches 90–96 and thus switch capacitors 62–68 of step three in shunt to conductors 30, 31, and 32;

Closes auxiliary contacts *a*3 to prepare an energizing circuit to relay F through contacts L209;

Opens auxiliary contacts *b*3 to release relay F; and

Opens auxiliary contacts *e*3 to prevent operation of relay E if relay L should close contacts 209.

Relays D, E, and F thus control the operation and release of the solenoid mechanisms 36, SM2, and SM3 for the first, second, and third step respectively. During the operation of connecting capacitors to the system, each relay D, E, and F in operating completes a circuit to connect the negative voltage supply line 185 to the close coil CC lead to the corresponding solenoid mechanism. Each solenoid mechanism 36, SM2, and SM3 in operating releases the corresponding control relay D, E, or F. In disconnecting the steps of capacitors, relay L closes operating circuits to relays F, E, or D to complete the circuit to the trip coil TC of the corresponding solenoid mechanism.

If the voltage on phase conductors 30, 31, and 32 rises above the upper limit, the contact making voltmeter V closes the VL contacts to complete an energizing circuit for relay L.

*Relay L operates*

Closes contacts L209 to complete an energizing circuit through auxiliary contacts *a*3 to the coil of relay F; and Closes contacts L220 to prepare a circuit to energize the lead *tc*3.

*Relay F operates*

Closes contacts F216 to connect negative voltage lead 185 to trip coil lead *tc*3 and thus energize the TC coil of solenoid mechanism SM3.

*Solenoid mechanism SM3 releases*

Actuates connecting rod 169 to open the twenty-one low voltage switches 90–96 and thus remove the capacitors 62–68 of step three from the system;

Closes auxiliary contacts *e*3 to prepare an energizing circuit to relay E; and

Opens auxiliary contacts *a*3 to release relay F.

If the system voltage again falls below the lower limit, contact making voltmeter V closes contacts VR to energize the coil of relay R. Operation of relay R energizes relay F to effect connection of step three to the system in the manner described hereinbefore. However, assuming the system voltage rises sufficiently to require removal of the second step of capacitors, the contact making voltmeter V again closes contacts VL to energize relay L.

*Relay L operates*

Closes contacts L209 to energize the coil of relay E through auxiliary contacts *e*3; and Closes contacts L221 to prepare an energizing circuit to the trip coil TC of solenoid mechanism SM2.

*Relay E operates*

Closes contacts E213 to connect the negative voltage lead 185 to the trip lead *tc*2.

*Solenoid mechanism SM2 releases*

Opens auxiliary contacts *d*2 to release relay E;

Closes auxiliary contacts *e*2 to prepare an energizing circuit for relay D; and Actuates connecting rod 168 to accomplish gang opening of twenty-one low voltage switches 80–86 and thus remove the capacitors of step two from the system.

If the voltage is still above the upper limit, relay V closes contacts VL to energize relay L.

*Relay L operates*

Closes contacts L209 to complete an energizing circuit through auxiliary contacts *d*1 and *e*2 to the coil of relay D; and Closes contacts L222 to prepare a circuit to energize lead *tc*1.

*Relay D operates*

Closes its contacts 207 to connect the negative voltage lead 185 to lead *tc*1 in order to energize the trip coil TC of the breaker 36.

*Oil circuit breaker 36 releases*

Opens its main contacts to disconnect the capacitor bank from the system; and

Opens auxiliary contacts *d*1 to release relay D.

An overcurrent relay OC (not shown) is energized from the secondary of a current transformer (not shown) having its primary in series with one of the main contacts of the oil circuit breaker 36. If a system fault causes excessive current flow to the capacitor bank, relay OC operates to close its OC contacts and connect the coil of lockout relay LO across the power supply lines 184 and 185.

*Relay LO operates*

Closes its contacts 231 to connect negative voltage lead 185 to *tc*1 in order to energize the trip coil TC of the oil circuit breaker 36 and thus remove the capacitor bank from the system.

In opening, circuit breaker 36 closes auxiliary contacts *e*1 to complete circuits from line 185 through contacts LO232 and LO233 to leads *tc*2 and *tc*3 respectively, thus energizing the trip coils of solenoid mechanisms SM2 and SM3 and resetting the entire bank.

If the selector switch is operated to close the Man contacts, operation of a two position control switch to close its contacts CSC will energize relay R and cause connection of a capacitor step, whereas operation of the switch to close its CST contacts energizes relay L to disconnect a capacitor step from the system.

Fig. 14 is a schematic circuit diagram of a control circuit to accomplish substantially simultaneous electrical actuation of the twenty-one low voltage switches of each step instead of mechanical gang operation as shown in the embodiment of Figs. 3 to 13. In electrical gang operation of the low voltage switches, the oil circuit breaker 36 is utilized to switch step one in a manner similar to the embodiment of Figs. 3 to 13, but the solenoid mechanisms SM2 and SM3 are not included.

A separate operating circuit is required for each rack of capacitors to provide selective operation of the low voltage switches of the rack in accordance with the step to be switched. The operating circuit is at the voltage of the corresponding rack, and thus the operating circuits must be insulated from each other by insulation of approximately 6500 volt rating. In the preferred embodiment, one-to-one ratio transformers having insulation of the 8000 volt class are utilized to insulate between the operating circuits.

Fig. 15 schematically illustrates such one-to-one ratio insulating transformers coupling between the four operating circuits of supporting framework 100A of phase one, i.e., one operating circuit for each rack 107A to 110A. The detail of the operating circuit for only one rack, i.e., rack 110A, are shown, but as explained hereinafter substantially identical operating circuits are required for each of the racks 107–110 of each phase. The control circuit of Fig. 14 and the operating circuits of Fig. 15 will be described together.

ELECTRICAL ACTUATION OF LOW VOLTAGE SWITCHES TO CONNECT CAPACITORS

As in Fig. 13, V is a contact making voltmeter having a pair of normally open VR contacts in series with a "raise voltage" R relay across the power supply lines 184 and 185 and a pair of normally open contacts VL in series with a "lower voltage" L relay across the conductors 184 and 185. It will again be appreciated that power factor control, kilovar control, or any other desired method can be utilized instead of voltage to control switching of capacitors as discussed in connection with Fig. 13. If the system voltage is below the lower limit of the band width, the voltmeter V closes its VR contacts to energize the coil of relay R.

*Relay R operates*

Closes its contacts 250 to complete an energizing circuit to the coil of relay D through the normally closed contacts 251 of lockout relay LO and the normally closed auxiliary contacts *b*1 of the oil circuit breaker 36; and Closes its contacts 252 to prepare a circuit to energize the "close coil" *cc*1 lead to the main solenoid CC of the oil circuit breaker 36.

Relay D is the control relay for the oil circuit breaker 36 and is of the slow-to-operate and slow-to-release thermal type to prevent "pumping" of the oil circuit breaker 36. The designation "TO," which is an abbreviation of "time operation," is utilized to indicate such a slow-to-operate relay. After its operate time elapses,

*Relay D operates*

Closes its contacts 254 to connect the lead 185 from the negative side of the power supply to the close coil lead *cc*1 to the oil circuit breaker 36.

*Oil circuit breaker operates*

Closes its auxiliary contacts *a*1 to prepare an energizing circuit for relay RX;

Opens its auxiliary contacts *b*1 to release relay D; and

Closes its main contacts (not shown) to connect conductors 69, 70, and 71 to phase conductors 30, 31, and 32 respectively and thus connect the first step of the capacitor bank to the power system.

In the preferred embodiment this includes switching the seven serially connected groups 42–48, having ten parallel capacitors per group, in each phase at full phase to neutral voltage. If the system voltage is still below the lower limit of the band width, the contacts VR of voltmeter V remain closed.

*Relay R operates*

Closes its contacts 250 to complete an energizing circuit for relay RX through the auxiliary contacts *a*1 of the oil circuit breaker, the normally closed contacts 255 of lockout relay LO, and the normally closed contacts 243 of sequence counting relay Q.

*Relay RX operates*

Closes its contacts 257 (see Fig. 15) to complete an energizing circuit for the coil of the "raise check" relay CR in series with the parallel arrangement of the primary coils of three one-to-one ratio transformers 260A, 260B (not shown) and 260C (not shown) in the racks 110A, 110B, and 110C of the phases one, two, and three respectively across the conductors 266 and 267 of a 115 volt alternating current power source.

One-to-one ratio insulating transformers 261A, 262A, and 263A of eight kilovolt insulation rating similarly couple the operating circuits for the racks 110A and 109A, the racks 109A and 108A, and the racks 108A and 107A respectively. The primary winding of a transformer 270A is connected in parallel with the primary coils of transformers 270B (not shown) and 270C (not shown) in phases two and three respectively, and this parallel circuit is connected in series with the coil of check relay CL and contact LX275 across the conductors 266 and 267 of the alternating current power source. Two coupling transformers, e.g., 260A and 270A, are provided between operating circuits to permit selective control of switching, i.e., operation of the low voltage switches to connect and to disconnect capacitors. One-to-one ratio transformers 271A, 272A, and 273A of eight kilovolt insulation rating also couple the operating circuits for the racks 110A and 109A, the racks 109A and 108A, and the racks 108A and 107A respectively.

Although the two insulating transformers between each rack, e.g., 260A and 270A, can be separate, in the preferred embodiment one transformer casing houses two separate magnetic cores each having one-to-one ratio primary and secondary windings thereon. The casing of each transformer is at the potential of its corresponding rack, while the primary windings of the two magnetic cores are at the potential of the rack below.

Connecting the primary winding of the transformers 260 across the 115 volt power source results in energization of the "close" bus of all of the twelve operating circuits. CR is a contact making ammeter which operates when a predetermined current flows through its coil. It is calibrated not to operate until a current flows through its coil corresponding to the current drain on the secondary windings of transformers 260 when the twenty watt resistors 280 of all twelve operating circuits are connected.

Although any desired type of low voltage switch having an operating coil to permit remote control may be utilized to accomplish substantially simultaneous actuation, i.e., electrical gang operation, of twenty-one low voltage switches of each step, the aforementioned switch disclosed in the application of William J. Weinfurt, Serial No. 113,273 is ideally suited for the switching of capacitors and is utilized in the disclosed embodiment of the invention. To provide remote control, each switch is provided with a unidirectional motor adapted to rotate a revoluble shaft to store energy and to snap the oil-immersed main contacts from one position to another and thus minimize arcing in the switching of capacitors. Each low voltage switch 80–86 and 90–96 has a limit switch having a pair of normally open "*a*" contacts, e.g., *a*M2, and a pair of normally closed "*b*" contacts, e.g., *b*M2, which are actuated by a cam on the motor shaft. Each low voltage switch 80–86 and 90–96 also has a pair of CDO contacts which are closed during the period that the motor is running.

Although four low voltage switches are provided for the operating circuit of each rack 107–109, for example, two low voltage switches 80A and 81A for step two and two low voltage switches 90A and 91A for step three of rack 107A, in order to simplify the drawing the rack 110A, which has only one switch 86A for step two and one switch 96A for step three, will be described. The circuit diagrams for all the other racks 107–109 are identical thereto with the addition of one remote control operating coil M2 and its associated switch contacts for a low voltage switch of step two and one remote control operating coil M3 and its associated switch contacts for a low voltage switch of step three. For example, the operating circuit for rack 107A has a remote control operating winding M2 for each of the low voltage switches 80A and 81A, and a remote control operating coil M3 for each of the low voltage switches 90A and 91A for step three. Further, the operating circuits for the racks 107–109 have an additional low voltage switch interlock relay H, an additional operation check relay X, and an additional operation check relay Y.

Relay J is connected across the close bus and the common lead of rack 110A, and relay H and the remote control operating winding, or motor winding, M2 of switch 86A are connected across the close and common leads through the normally closed limit switch contacts *b*M2 of switch 86A. Closure of contacts RX257 energizes the close bus.

*Relay J operates*

Closes its contacts 282 to prepare a circuit for relay X; and

Closes its contacts 302 to prepare a circuit to connect the twenty watt resistor 280 across the close bus and the common lead.

*Relay H operates*

Separates its contacts 318 to open the circuit to remote control operating coil M3 of low voltage switch 96A.

*Low voltage switch 86A*

Closes contacts M2CDO to complete a circuit to relay X; and

Rotates a revoluble shaft to store energy in spring means for approximately 180° of rotation of the shaft, which energy is then released to snap the main contacts (not shown) to closed position and connect the ten capacitors 58A of rack 110A in parallel with the capacitors 48A switched by the oil circuit breaker 36.

The operating coils M2 of all twenty-one low voltage switches 80–86 are thus energized simultaneously and switch the 210 capacitors 52–58 substantially simultaneously to the system. The low voltage switch, being a motor driven device which rotates a shaft to store energy and releases the stored energy to snap the main contacts between open and closed positions, inherently has some lost motion. Consequently, the contacts of all low voltage switches 80–86 do not close exactly simultaneously, varying a few cycles in time of operation. If the contacts of all switches operated exactly simultaneously, an immediate rise, or surge, in the system voltage might occur. The variation in time of operation of the low voltage switches connects the capacitor groups 52–58 to the system over the period of a few cycles, and oscillographs show that the system voltage gradually rises over the period of a few cycles without peaks or sudden surges in the voltage. A predetermined sequential operation of the low voltage switches can be accomplished if means are provided to sequentially energize the remote control operating coils of the low voltage switches. However, in the preferred embodiment of the invention random operation of the contacts of the low voltage switches is desirable.

The voltage across any one of a group of series capacitors is inversely proportional to its capacitance in microfarads. When any one group 52–58 of parallel capacitors in step two is connected in shunt to a group 42–48 of step one, and thus increases the capacitance, the voltages across the remaining serially connected groups of step one are increased. On those groups of step one to which capacitors of step two have not yet been connected in parallel, the voltage increases each time a low voltage switch 80–86 operates. In other words, until a particular switch 80–86 operates, e.g., 81A, an overvoltage occurs on the corresponding capacitor group 42–48 of step one, i.e., 43A, after the first low voltage switch of that phase and step operates e.g., 85A, and the magnitude of the overvoltage increases each time another of the switches 80–86 operates. The overvoltage is greatest on that group 42–48 corresponding to the last of the switches 80–86 to operate. Capacitors can safely withstand considerable temporary overvoltages without harm.

The capacitor bank of the invention is designed so that overvoltage does not remain on any group of capacitors for a sufficient duration to damage the capacitors. However, if the low voltage switches 80–86 were always operated in a predetermined sequence, the particular group 42–48 of capacitors of step one corresponding to the last of the switches 80–86 to operate would always be stressed by the greatest overvoltage. Consequently, the random operation provided by the aforementioned low voltage switches is the preferred form of the invention. Thus no one group of capacitors 42–48 is subject to the maximum overvoltage in successive operations, and over a period of time the stresses caused by overvoltages balance out on all of the groups, while at the same time the system voltage rise caused by the switching of a step of capacitors increases gradually over a period of several cycles.

The contacts M2CDO close during the energization of remote control operating coil M2 and complete a circuit to relay X.

*Relay X operates*

Closes its contacts 285 to lock itself operated; and

Closes its contacts 286 to connect the resistor 280 across the close bus and the common lead.

When the resistors 280 in all twelve racks 107–110 have been connected, the current drain on the secondary windings of the three transformers 260 is sufficient to cause check relay, i.e., contact making ammeter, CR to operate.

*Relay CR operates*

Opens its contacts 290 to release relay RX;
Closes its contacts 291 to complete an energizing circuit to auxiliary check relay K; and
Opens its contacts 292 to prevent operation of auxiliary lockout relay LOX.

*Relay RX releases*

Opens its contacts 294 to open the circuit to relay LOX.
Auxiliary check relay K is of the thermal type having an operate time of approximately one second.

*Relay K operates*

Closes its contacts 295 to lock itself operated through the normally closed contacts 296 of relay P; and
Closes its contacts 297 to complete an energizing circuit to the operate coil of relay P.
Sequence counting relays P and Q are of the two coil, mechanically latched type which operate and mechanically latch upon energization of an operate coil, designated "O," and release upon energization of a release coil, designated "R." Operation of relay P is an indication that the second step of capacitors has been connected to the system.

*Relay P operates and mechanically latches*

Opens its contacts 296 to release relay K;
Closes its contacts 298 to prepare a circuit to the coil of relay LOX;
Closes its contacts 321 to prepare an energizing circuit to relay LX;
Closes its contacts 299 to prepare an energizing circuit to the operate coil "O" of relay Q; and
Opens its contacts 341 to prevent operation of relay D while any of the low voltage switches are operated.

*Relay K releases*

If the voltage of the system is still below the lower limit of the band width, requiring additional kvar. to be connected to the system, the contacts VR of the voltmeter again connect relay R across the supply lines 184 and 185 from the power source.

*Relay R operates*

Closes its contacts 250 to complete an energizing circuit to relay RX through auxiliary contacts *a*1 and contacts LO255 and Q243.

*Relay RX operates*

Closes its contacts 257 to connect relay CR of the operating circuit in series with the paralleled primaries of the insulating transformers 260, thus energizing the close bus of all twelve operating circuits; and
Closes its contacts 259 to lock itself operated.
Energization of the close bus actuates relay J and the remote control operating coil M3 of low voltage switch 96A. The circuit to the operating coil M2 of low voltage switch 86A is open at the limit switch contacts *b*M2 which were operated along with the main contacts.

*Relay J operates*

Closes its contacts 283 to prepare an energizing circuit for relay Y; and
Closes its contacts 302 to prepare a circuit to the resistor 280.

*Low voltage switch 96A*

Closes contacts M3CDO during energization of the motor coil M3 to complete a circuit to the coil of relay Y; and
Closes its main contacts (not shown) to connect the ten capacitors 68A in parallel with the twenty capacitors 48A and 58A switched in the first and second step respectively.

All twenty-one low voltage switches 90–96 operate substantially simultaneously in the manner described for step two of rack 110A to connect the 210 capacitors 62–68 to the system.

*Relay Y operates*

Closes its contacts 305 to lock itself operated; and
Closes its contacts 306 to connect the resistor 280 across the close and common leads.
After the resistor 280 of all twelve operating circuits have been connected,

*Contact making ammeter CR*

Closes its contacts 291 to complete an energizing circuit to relay K;
Closes its contacts 308 to complete an energizing circuit to the operate "O" coil of sequence counting relay Q;
Opens its contacts 292 to prevent operation of relay LOX; and
Opens its contacts 290 to release relay RX.

*Relay RX releases*

Before slow-to-operate relay K can operate to open its contacts 309 and open the circuit to the operate coil "O" of relay Q,

*Relay Q operates and mechanically latches*

Opens its contacts 243 to prevent operation of relay RX;
Opens its contacts 310 to prevent energization of the release coil "R" of relay P;
Closes its contacts 311 to prepare a locking circuit for relay S; and
Opens its contacts 312 to prevent operation of relay LOX.
Even if the system voltage is below the lower limit of the band width, it is impossible for relay RX to again operate and energize the twelve operating circuits inasmuch as the sequence counting relay Q keeps the circuit to relay RX open. Relay Q thus indicates that the third step of capacitors has been connected to the system.

ELECTRICAL ACTUATION OF LOW VOLTAGE SWITCHES TO DISCONNECT CAPACITORS

Assuming all three steps of capacitors have been connected, if the system voltage is above the upper limit of the band width, contact making voltmeter V closes its VL contacts to connect the coil of relay L across the leads 184 and 185 from the source of power.

*Relay L operates*

Closes its contacts 320 to connect the coil of relay LX through contacts P321 across the leads 184 and 185.
Relay LX is a thermal relay of the slow-to-operate type and is calibrated to operate after a time being of approximately fifteen seconds.

*Relay LX operates*

Closes its contacts 323 to lock itself operated; and
Closes its contacts 275 (see Fig. 15) to connect the parallel arrangement of the primary coils of the three one-to-one ratio insulating transformers 270 across the leads 266 and 267 from the 115 volt alternating current power source.
The transformers 270A, 270B (not shown), and 270C (not shown) are in phases one, two, and three respectively, and connection of their primaries across an alternating current source results in energization of the open bus of the operating circuits for the three racks 110A, 110B, and 110C. The operating circuits for the remaining racks are coupled to the operating circuit for racks 110 through the one-to-one ratio insulating transformers 271, 272, and 273. Energization of the open bus actuates relay N, actuates relay H and the remote control operating coil M2 of low voltage switch 86A through its *a*M2 contacts, and also actuates the operating coil M3 of low voltage switch 96A through its *a*M3 contacts.

*Relay N operates*

Closes its contacts 314 to prepare a circuit to relay Y;
Closes its contacts 315 to prepare a circuit to resistor 280; and
Closes its contacts 316 to prepare an energizing circuit for relay X.

*Relay H operates*

Opens its contacts 318 to de-energize coil M3.

*Low voltage switch 86A*

Closes its M2CDO contacts to complete a circuit to relay X;
Snaps open its main contacts to disconnect the ten capacitors 58A from in shunt with the ten capacitors 48A;
Opens its *a*M2 contacts to release relay H; and
Closes its *b*M2 contacts.

The capacitors 58A are disconnected at voltages which are only 1/7 of the voltage between conductor 30 and neutral 34 and the other twenty low voltage switches of the step are actuated substantially simultaneously with switch 86A.

*Relay X operates*

Closes its contacts 286 to connect the resistor 280 across the open and common leads; and
Closes its contacts 319 to open the circuit to remote control operating coil M3.

During disconnection of a step of capacitors, contact making ammeter CL checks the operation of the operating circuits of all of the twelve racks in exactly the same manner as relay CR functioned during connection of a step of capacitors. After all resistors 280 of the twelve operating circuits are connected between their respective open and common leads,

*Contact making ammeter CL operates*

Opens its contacts 330 to release relay LX; and
Closes its contacts 331 to complete a circuit to the coil of auxiliary check relay S.

Relay S is of the slow-to-operate type, and after an interval equal to its operate time elapses,

*Relay S operates*

Closes its contacts 335 to complete a circuit to the release coil "R" of sequence counting relay Q;
Closes its contacts 336 to lock itself operated; and
Opens its contacts 337 to open the circuit to the release coil "R" of relay P.

*Relay Q releases*

Closes its contacts 243 to prepare a circuit to relay RX.

*Relay LX releases*

Opens its contacts 275 to release check relay CL and de-energize the open bus.

Release of sequence counting relay Q indicates that the low voltage switches of one step have opened and that the capacitors corresponding thereto have been disconnected from the system. If the voltage dropped below the lower limit of the band width, the sequential operation of relays R and RX would again energize the operating coil M2 of switch 86A and effect connection of the capacitors to the system. Assume however that the voltage is above the upper limit of the band width, causing voltmeter V to close its VL contacts.

*Relay L operates*

Closes its contacts 320 to complete a circuit to the coil of relay LX.

After its operate time elapses,

*Relay LX operates*

Closes its contacts 323 to lock itself operated;
Closes its contacts 275 to energize the paralleled primary windings of the three transformers 270 and thus effect energization of the open bus of all twelve operating circuits.

*Relay N operates*

Closes its contacts 316 to prepare a circuit to relay X; and
Closes its contacts 315 to prepare a circuit to resistor 280.

*Low voltage switch 96A*

Closes its M3CDO contacts to complete a circuit to relay Y;
Snaps its main contacts (not shown) open after approximately half a revolution of the shaft to disconnect the capacitors 68A from the system; and
Closes its *b*M2 contacts and opens its *a*M2 contacts.

*Relay Y operates*

Closes its contacts 306 to connect the resistor 280 across the open and common leads.

After the resistors 280 of all twelve operating circuits have been connected,

*Relay CL operates*

Closes its contacts 340 to complete a circuit to the release coil "R" of relay P; and
Closes its contacts 331 to complete a circuit to auxiliary check relay S.

*Relay P releases*

Closes its contacts 341 to complete an energizing circuit to relay D through contacts L320.

Release of sequence counting relay P indicates that only the first step of capacitors is connected to the system.

If the voltage still remains above the upper limit of the band width, voltmeter V again closes contact VL to operate relay L, which closes contacts L320 to complete an energizing circuit to relay D. After its operate time of approximately fifteen seconds elapses,

*Relay D operates*

Closes its contacts 254 to complete a circuit through the contacts 342 of relay L to connect, the lead 185 from the negative side of the power source to the lead *tc*1 to the trip coil TC of the oil circuit breaker 36.

The breaker 36 releases its main contacts to remove the capacitor bank from the system.

Auxiliary lockout relay LOX is of the slow-to-operate and slow-to-release type having an operate time of approximately 30 seconds. Relay LOX is energized either through contacts 294 of relay RX or contacts 346 of relay LX, in series with both a pair of normally closed contacts 347 of check relay CL and a pair of normally closed contacts 292 of check relay CR. In normal operation, the check relays CR or CL operate within a sufficient time after the corresponding relay LX or RX to prevent operation of relay LOX. However, if during an attempt to operate the low voltage switches, a fault in any of the twelve operating circuits prevents connection of a resistor 280, the corresponding check relay, i.e., contact making ammeter, CL or CR fails to operate, and

*Relay LOX operates*

Closes its contacts 350 to complete a circuit to lockout relay LO.

*Relay LO operates*

Closes its contacts 351 to connect negative lead 185 to the lead *tc*1 to energize the trip coil TC of the oil circuit breaker;

Separates its contacts 251 to open the circuit to relay D and thus prevent the completion of a circuit to the close coil CC of the oil circuit breaker 36; and Separates its contacts 255 to open the circuit to the coil of relay RX.

The oil circuit breaker 36 then opens its main contacts to remove the capacitor bank from the system.

It should now be apparent that means have been provided for switching capacitors in shunt to a power system without danger of restrikes and voltage surges and at a cost considerably below that of systems heretofore used. Although in the preferred embodiments each low voltage switch is shown as switching a plurality of paralleled capacitors, the invention also encompasses the connection of a single capacitor by such a low voltage switch. Both electrical and mechanical means have been disclosed for operating the low voltage switches, and it is apparent that it is within the scope of the invention to actuate such low voltage switches hydraulically or pneumatically through insulated tubing. Although in the preferred embodiments, a plurality of capacitors connected in series is utilized as a voltage divider connected in shunt to the system to permit switching of capacitors at only a fraction of the system voltage, it will be appreciated that the invention is not so limited and comprehends any known voltage dividing means. Although serially connected capacitors connected in shunt to the system are preferable in that they supply desired reactive power, a resistance connected in shunt to the system is equally effective as a voltage dividing means even though it dissipates power. Certain embodiments of the invention have been shown and described for the purpose of illustration, but it is to be understood that the invention is not limited to these specific arrangements, but in its broadest aspects, it includes all equivalent embodiments and modifications which come within the scope of the appended claims.

What I claim as new and desire to secure by Letters Patent of the United States is:

1. In a polyphase alternating current power system, in combination, a capacitor bank adapted to be connected in shunt to said system in a plurality of steps, each step including a plurality of groups of paralleled capacitors in each phase, the groups of capacitors of the first step in each phase being connected in series, said serially connected groups being connected in shunt to said system, and means for connecting the individual groups of each succeeding step in parallel with individual groups of the first step.

2. In an electrical power system, the combination with a polyphase alternating current line, of a capacitor bank adapted to be connected in shunt to said line in a plurality of steps, each step including a plurality of groups of paralleled capacitors in each phase, the groups of capacitors of the first step in each phase being connected in series, switching means for connecting said serially connected groups of the first step in each phase in shunt to said line, an electrical switch for each group of each succeeding step connected in a series circuit with said group and a group of said first step, and means for operating the switches of each succeeding step substantially simultaneously.

3. In a polyphase alternating current power system, in combination, a capacitor bank adapted to be connected in shunt to said system in a plurality of steps, each step including a plurality of capacitors in each phase, the capacitors of the first step in each phase being connected in series, means for connecting the serially connected capacitors of the first step of each phase in shunt to said system, and means for connecting the capacitors of each succeeding step in parallel with a capacitor of the first step.

4. In an alternating current electrical power system, in combination, a plurality of first electrical power factor correcting capacitors connected in series, said serially connected capacitors being connected in shunt to said power system, the junctures of said serially connected capacitors being ungrounded, a second power factor correcting electrical capacitor, and an electrical switch for connecting said second capacitor in parallel with one of said serially connected first capacitors.

5. A capacitor bank to be connected in shunt to an alternating current power line, comprising, in combination, a plurality of serially connected first power factor correcting capacitors, switching means for connecting said serially connected first capacitors in shunt circuit relation with said power line, the junctures of said serially connected first capacitors being ungrounded, a plurality of other power factor correcting capacitors, and a plurality of electrical switches, each of said first capacitors being in a series circuit with one of said electrical switches and one of said other capacitors.

6. In an alternating current electrical power system, in combination, a voltage dividing impedance connected in shunt to said system and having all points intermediate its ends ungrounded, whereby the voltage of said power system is impressed across said impedance, a plurality of electrical reactances, and means including a plurality of circuit makers for substantially simultaneously switching said reactances in shunt with fractions only of said impedance across each of which the voltage drop is less than the system voltage.

7. In a capacitor bank to be connected to an alternating current power system, in combination, voltage dividing impedance means, means for connecting said impedance means in shunt to said system, a plurality of capacitors, a plurality of electrical switches, each of said switches being in a series circuit with one of said capacitors and a portion only of said voltage dividing impedance means, and means for operating said switches substantially simultaneously.

8. In a capacitor bank having a plurality of groups of paralleled capacitors to be connected to an alternating current power system, in combination, a voltage divider connected in shunt to said system and having a plurality of sections of equal impedance, a plurality of electrical switches equal in number to said sections, each section being in a series circuit with one of said switches and one of said groups, and means for operating said switches substantially simultaneously.

9. A capacitor bank adapted to be connected in shunt to an alternating current power line, comprising, in combination, a plurality of serially connected first capacitors, said serially connected capacitors being connected in shunt to said line, a plurality of other capacitors, a plurality of electrical switches having different operating times, each of said other capacitors being in a series circuit with one of said electrical switches and one of said other capacitors, and means for simultaneously actuating said electrical switches.

10. In a polyphase alternating current power system, in combination, a capacitor bank adapted to be connected to said system in a plurality of steps, each step including a plurality of groups of paralleled capacitors in each phase, the groups of capacitors of the first step in each phase being connected in series with each other, said serially connected groups being connected in shunt to said system, and means for connecting the groups of each succeeding step at slightly spaced apart intervals in parallel with individual groups of the first step.

11. In a capacitor bank for an alternating current power line, in combination, a supporting framework having a plurality of spaced racks, means for insulating between said racks, at least one capacitor on each rack, at least one electrically actuated switch on each rack, said switches being adapted when actuated to connect said capacitors in series, and means including insulating transformer means electrically connecting the switches of adjacent racks for actuating said switches substantially simultaneously.

12. In a capacitor bank to be connected to an alternating current power line in a plurality of steps, a framework having a plurality of spaced racks, means for insulating between said racks, each step having at least one group of paralleled capacitors on each rack, the groups of the first step being connected in series with each other and in shunt to said power line, an electrically actuated switch on each rack for each group of each succeeding step adapted to connect its corresponding group in parallel with the group of the first step, and means including insulating transformers electrically connecting the switches of the same step in adjacent racks for actuating the switches of each step substantially simultaneously.

13. In a capacitor bank having a plurality of serially connected first groups of paralleled capacitors connected in shunt to an alternating current power line and a plurality of second groups of capacitors adapted to be connected in shunt to individual first groups, in combination, a supporting framework having a plurality of spaced racks each of which supports at least one of said first groups and at least one of said second groups, means for insulating between said racks, an electrically actuated switch on each rack for connecting said first group in shunt with said second group, and means including an insulating transformer for electrically connecting the switches of adjacent racks.

14. A capacitor bank adapted to be connected to an alternating current power line, comprising, in combination, a plurality of first capacitors arranged in a series circuit, means for connecting said series circuit in shunt to said line, a plurality of electrical switches, a plurality of other capacitors, each first capacitor being connected in a series circuit with one of said switches and one of said other capacitors, and means for operating said switches substantially simultaneously.

15. A capacitor bank adapted to be connected to an alternating current power line comprising, in combination, a plurality of serially arranged groups of paralleled first capacitors, means for connecting said serially arranged groups in shunt to said line, a plurality of electrical switches equal in number to said serially arranged groups, a group of paralleled second capacitors for each of said switches, each of said first groups being connected in a series circuit with one of said switches and one of said groups of second capacitors, and means for operating said electrical switches substantially simultaneously.

16. In a polyphase alternating current power system, in combination, a capacitor bank adapted to be connected in star to said circuit in a plurality of steps, each step including a plurality of groups of paralleled capacitors in each phase adapted to be connected substantially simultaneously to said system, the groups of capacitors of the first step of each phase being connected in series, switching means for connecting the serially connected groups of the first step of each phase between said phase and the neutral, the number of groups of each succeeding step in each phase being equal to the number of serially connected groups of said first step in said phase, and means for substantially simultaneously connecting the groups of each succeeding step in parallel with individual groups of the first step.

17. In a polyphase alternating current power system, a plurality of serially connected first groups of paralleled capacitors for each phase, switching means for electrically connecting said serially connected groups in shunt to said power circuit, a plurality of first electrical switches, a plurality of second electrical switches, a plurality of other groups of paralleled capacitors, each of said first groups being in a series circuit with one of said first electrical switches and one of said other groups and also being in a series circuit with one of said second electrical switches and one of said other groups, means for operating said first switches substantially simultaneously, and means for operating said second switches substantially simultaneously.

18. In an alternating current power line, a voltage dividing impedance connected in shunt to said line with all points intermediate its ends ungrounded, a plurality of electrical reactances, a plurality of electrical circuit makers each in series with one of said reactances, the serial arrangements of reactances and circuit makers being in shunt with fractions only of said impedance across each of which the voltage drop is only a fraction of the voltage of said line, means for sensing the magnitude of an electrical condition of said line, means for actuating said circuit makers substantially simultaneously, and means responsive to a predetermined deviation of the magnitude of said condition from a predetermined value for controlling the operation of said actuating means.

19. In a polyphase alternating current power system, in combination, a capacitor bank to be connected in shunt to said system in a plurality of steps, each step including a plurality of capacitors in each phase, the capacitors in each phase of the first step being connected in series, means for connecting the serially connected capacitors of the first step in shunt to said system, and means for switching the capacitors of each phase of a succeeding step in parallel with capacitors of the corresponding phase of the first step across each of which the voltage drop is only a fraction of the voltage impressed across the serially connected capacitors of the first step.

20. In a polyphase alternating current power system, in combination, a capacitor bank adapted to be connected in star to said circuit in a plurality of steps, each step including a plurality of capacitors in each phase, the capacitors of the first step in each phase being connected in series, means for connecting the serially connected capacitors of the first step of each phase between the corresponding phase conductor and the neutral, whereby phase to neutral voltage is divided across the serially connected capacitors of the first step, and means for switching the capacitors of succeeding steps in parallel with capacitors of the first step across each of which only a fraction of phase to neutral voltage exists.

21. The method of varying an electrical condition of an alternating current power line, comprising connecting a voltage dividing impedance in shunt to said power line with all points intermediate its ends ungrounded, whereby the voltage of said power line divides across said impedance, sensing the magnitude of an electrical power factor correcting condition of said power line, and switching electrical capacitors in parallel with fractions only of said impedance in response to a predetermined deviation in the magnitude of said condition from a predetermined value.

22. The method of varying an electrical condition of an alternating current power line which condition can be varied by connecting electrical reactance to said power line, comprising sensing the magnitude of said electrical condition of said power line, switching a serial arrangement of electrical reactances in response to a predetermined deviation in the magnitude of said condition from a predetermined value in shunt to said power line with the junctures of said serially arranged reactances ungrounded, whereby said electrical condition of said power line is varied, and subsequently switching electrical reactances in response to the continuation of said predetermined deviation in parallel with fractions only of said impedance.

23. In an alternating current electrical power system, a metallic rack, means for insulating said rack from ground, electrical capacitors on said rack, an electrical switch mounted on said rack and adapted to switch said capacitors in electrical circuit relation with said power system at potentials differing from ground, said electrical switch being operable upon receipt of an electrical actuating signal, and means including an insulating transformer for supplying from a remote location an electrical signal to operate said switch.

References Cited in the file of this patent

UNITED STATES PATENTS

| | | |
|---|---|---|
| 2,374,050 | St. Palley | Apr. 17, 1945 |
| 2,484,575 | Livingston | Oct. 11, 1949 |
| 2,754,477 | Dunand | July 10, 1956 |

UNITED STATES PATENT OFFICE

CERTIFICATE OF CORRECTION

Patent No. 2,887,647 May 19, 1959

Henry H. Strozier

It is hereby certified that error appears in the printed specification of the above numbered patent requiring correction and that the said Letters Patent should read as corrected below.

Column 26, lines 51 and 52, strike out "power factor correcting" and insert the same after "electrical" in line 53, same column.

Signed and sealed this 8th day of December 1959.

(SEAL)
Attest:

KARL H. AXLINE
Attesting Officer

ROBERT C. WATSON
Commissioner of Patents